US012562985B2

(12) United States Patent　　　　(10) Patent No.: US 12,562,985 B2

Mishra　　　　　　　　　　　　　(45) Date of Patent: Feb. 24, 2026

(54) SYSTEMS AND METHODS FOR ADVERTISING IP VERSION 6 NETWORK LAYER ROUTING INFORMATION WITH AN IP VERSION 4 NEXT HOP ADDRESS

(71) Applicant: Verizon Patent and Licensing Inc., Basking Ridge, NJ (US)

(72) Inventor: Gyan S. Mishra, Boyds, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 840 days.

(21) Appl. No.: 17/663,527

(22) Filed: May 16, 2022

(65) Prior Publication Data

US 2023/0370372 A1　　Nov. 16, 2023

(51) Int. Cl.
*H04L 45/741*　　(2022.01)
*H04L 45/02*　　(2022.01)

(52) U.S. Cl.
CPC ............ *H04L 45/741* (2013.01); *H04L 45/04* (2013.01)

(58) Field of Classification Search
CPC .............................. H04L 45/741; H04L 45/04
See application file for complete search history.

(56) References Cited

U.S. PATENT DOCUMENTS

2010/0061385 A1*　3/2010　Welin ...................... H04L 45/64
　　　　　　　　　　　　　　　　　　　　380/277
2020/0067844 A1*　2/2020　Pularikkal ............... H04L 69/22
2021/0021517 A1*　1/2021　Sellappa ............... H04L 45/745
2022/0311643 A1*　9/2022　Chundu ............. H04L 12/4675

OTHER PUBLICATIONS

IETF; RFC 2545; 1999 (Year: 1999).*
IETF; RFC 2413; 2005 (Year: 2005).*
IETF; RFC 8950; 2020 (Year: 2020).*
Internet Assigned Numbers Authority; Capability Codes; Feb. 19, 2021; 2 pages.
RFC 2545; Use of BGP-4 Multiprotocol Extensions for IPV6 Inter-Domain Routing; Mar. 1999; 5 pages.
RFC 4271; A Border Gateway Protocol 4 (BGP-4); Jan. 2006; 104 pages.
RFC 4291; IP Version 6 Addressing Architecture; Feb. 2006, 25 pages.
RFC 4364; BGP/MPLS IP Virtual Private Networks (VPNs); Feb. 2006; 47 pages.
RFC 4659; BGP-MPLS IP Virtual Private Network (VPN) Extension for IPv6 VPN; Sep. 2006; 18 pages.
RFC 4760; Multiprotocol Extensions for BGP-4; Jan. 2007; 12 pages.
RFC 4798; Connecting IPv6 Islands over IPv4 MPLS Using IPv6 Provider Edge Routers (6PE); Feb. 2007; 14 pages.

(Continued)

*Primary Examiner* — Ricky Q Ngo
*Assistant Examiner* — Stephen N Steiner

(57)　　　　　　ABSTRACT

In some implementations, a first network device may encode Internet protocol version 4 (IPv4) next hop of Internet protocol version 6 (IPv6) information. The first network device may advertise the IPv6 information to a second network device via an IPv4 border gateway protocol. The first network device may forward an IPv6 packet via an IPv4 interface associated with the first network device based on advertising the IPv6 information.

20 Claims, 13 Drawing Sheets

(56) References Cited

OTHER PUBLICATIONS

RFC 5492; Capabilities Advertisement with BGP-4; Feb. 2009; 7 pages.
RFC 5565; Softwire Mesh Framework; Jun. 2009; 31 pages.
RFC 6513; Multicast in MPLS/BGP IP VPNs; Feb. 2012; 88 pages.
RFC 6514; BGP Encodings and Procedures for Multicast in MPLS/BGP IP VPNs; Feb. 2012; 59 pages.
RFC 8277; Using BGP to Bind MPLS Labels to Address Prefixes; Oct. 2017; 23 pages.
RFC 8950; Advertising IPv4 Network Layer Reachability Information (NLRI) with an IPV6 Next Hop; Nov. 2020; 12 pages.

* cited by examiner

SYSTEMS AND METHODS FOR ADVERTISING IP VERSION 6 NETWORK LAYER ROUTING INFORMATION WITH AN IP VERSION 4 NEXT HOP ADDRESS

BACKGROUND

Border gateway protocol (BGP) is a standardized exterior gateway protocol designed to exchange routing and reachability information among autonomous systems (ASs). BGP is classified as a path-vector routing protocol, and makes routing decisions based on paths, network policies, or rule sets configured by a network administrator. BGP used for routing within an AS (Autonomous System) is called interior BGP (iBGP) and BGP used for routing outside of the AS (Autonomous System) is called exterior BGP (eBGP).

DETAILED DESCRIPTION OF PREFERRED EMBODIMENTS

Figure 1A:
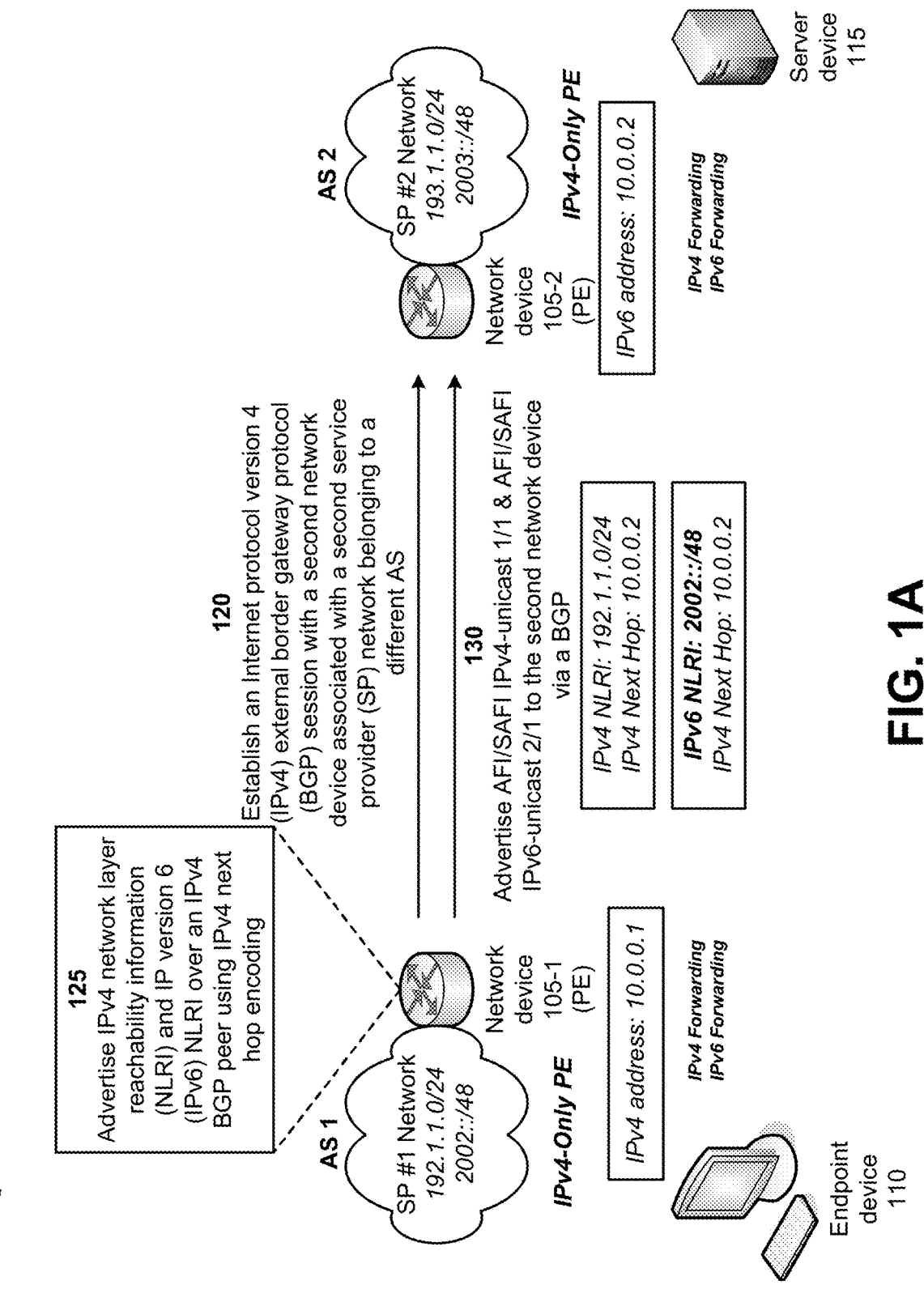
FIGS. 1A-1I are diagrams of an example associated with advertising IP version 6 (IPv6) network layer routing information (NLRI) with an IP version 4 (IPv4) next hop without an IPv6 address configured on the interface while maintaining "Dual Stack" functionality and IP version 4 (IPv4) forwarding and IP version 6 (IPv6) forwarding.

The following detailed description of example implementations refers to the accompanying drawings. The same reference numbers in different drawings may identify the same or similar elements.

Multiprotocol border gateway protocol (BGP) (MP-BGP) provides an ability to associate a network layer protocol with next hop information and network layer reachability information (NLRI) being advertised. BGP advertises IP version 4 (IPv4) and IP version 6 (IPv6) NLRI using MP-BGP reachability capability (MP_REACH capability). MP_REACH capability may be exchanged between BGP peers for a particular address family identifier (AFI) and a subsequent address family identifier (SAFI) 2-tuple combination. The 2-tuple combination may be advertised using IPv4 or IPv6 next hop encodings. AFI and SAFI 2-tuple combinations are typically advertised using IPv4 next hop encoding or IPv6 next hop encoding. The AFI/SAFI combination are represented hereinafter as "X/Y" where the X is the Address Family Identifier is either Protocol value "1" for IPv4 protocol or value "2" for IPv6 protocol and the Y is the Subsequent Address Family Identifier.

Typically, BGP peering may be used to advertise NLRI. A provider edge network device in MPLS terms called a Label Edge Router (LER) in this document may be referred to hereinafter as "PE." A provider network device in MPLS terms called a Label Switch Router (LSR) may be referred to hereinafter as "P". A route reflector network device will be referred to hereinafter as "RR". A customer edge network device may be referred to hereinafter as "CE."

External BGP (eBGP) peering types are referred to hereinafter as provider edge (PE)—customer edge (CE), called "PE-CE peering," or provider edge (PE)—provider edge (PE), called "PE-PE peering," with both scenarios being referred to hereinafter as "Edge-Peering." Internal BGP (iBGP) peering types may include PE to route reflector (RR) peering, which is referred to hereinafter as "Core-Peering." The customer edge network device will be referred to hereinafter as "CE." The provider edge network device will be referred to hereinafter as "PE." The route reflector network device will be referred to hereinafter as "RR."

Historically, MP-BGP would advertise NLRI (e.g., IPv4 NLRI and/or IPv6 NLRI) and set the next hop to the address family to which the NLRI belongs, as the NLRI advertised would have to match the protocol of the next hop.

The "Soft-Wire" mesh framework concept is based on an underlay and overlay technology framework. The underlay acts as the "transport" layer. The overlay is a Virtual Private Network (VPN) overlay, and acts as the tunneled "virtualization" layer containing the customer payload. The concept of a "Soft-Wire" is based on transmission of IPv4 packets at the edge of the network by tunneling the IPv4 packets over an IPv6 Core. The concept of a "Soft-Wire" is also based on transmission of IPv6 packets at the edge of the network by tunneling the IPv6 packets over an IPv4 Core.

With implementations described herein, the "Soft-Wire" continues to terminate on the PE network device. Implementations described herein include the transmission of IPv6 packets related to Edge-Peering. Implementations described herein relate to a new IANA (Internet Assigned Numbering Authority) assigned a particular capability value "To Be Determined" IPv4 next hop encoding over a pure IPv4 transport peer and forwarding of IPv6 packets over the "Edge-Peering," over an IPv4-Only interface configured on each adjacent network device. Implementations described herein include the transmission of IPv6 packets at the edge of the network, "Edge-Peering," by forwarding IPv6 packets over IPv4-Only interface network devices while maintaining both an IPv4 forwarding plane and an IPv6 forwarding plane. Additionally, the transmission of IPv6 packets may be performed by advertising control plane routing information, for IPv4 NLRI and IPv6 NLRI, with IPv4 next hop encoding over a pure IPv4 transport peer.

The pure IPv4 transport peer may be applied to any existing AFI/SAFI 2-tuple combinations, as well as any AFI/SAFI 2-tuple combination developed in the future.

Today all external BGP peering advertisement of an IPv6 address family with any SAFI over an IPv4 Core is done using a separate BGP peer for IPv4 NLRI and a separate BGP peer for IPv6 NLRI, as the NLRI advertised matches the BGP next hop address family. This external BGP peering advertisement requires BGP peering connections to provide IPv6 interfaces, mandates provision of IPv6 point-to-point infrastructure links, creates memory issues associated with storing IPv6 addresses, and increases costs associated with administration and network management of IPv6 peer network devices. Furthermore, current service providers are not yet ready to migrate their transport underlay to an IPv6, or would rather keep their underlay transport layer for the purpose of capital expenditure savings.

Thus, current techniques for handling advertisement of IPv6 addresses waste computing resources (e.g., processing resources, memory resources, communication resources, and/or the like), network resources, and/or other resources associated with providing and maintaining IPv6 interfaces on network devices, providing and maintaining the IPv6 point-to-point infrastructure links, storing the IPv6 addresses, managing IPv6 peer network devices, and handling and storing of larger 128 bit IPv6 addresses as compared to 32 bit IPv4 addresses, among other examples. Current techniques for handling advertisement of IPv6 addresses further consume storage resources for storing IPv4 and IPv6 dual stack control planes as well as forwarding plane resources with additional memory and computing consumption. In this regard, IPv6 consumes 4 times more memory and resources than IPv4.

Some implementations described herein relate to a network device that advertises IPv6 NLRI with an IPv4 next hop. For example, a first network device associated with a network may establish a single IPv4 session acting as a pure transport mechanism with a second network device associated with the network. The first network device may advertise IPv4 NLRI and IPv6 NLRI, using IPv4 next hop encoding, to the second network device by utilizing a new IPv4 extended next hop encoding capability for dynamic discovery of whether a peer can exchange IPv6 NLRI with an IPv4 next hop.

In this way, the first network device may advertise IPv6 NLRI with an IPv4 next hop. The first network device may utilize the next hop encoding of IPv6 NLRI with an IPv4 next hop address to be used for eBGP peering between a CE network device and a PE network device. The first network device may be a PE network device, a CE network device, among other examples.

The first network device will have all of its IPv6 addressing removed with the IPv4-Only PE Design using an IPv4 Pure transport peering, thus will eliminate all IPv6 peering, which may provide significant reduction in infrastructure and operational expenditure (OPEX) savings. For example, implementations described herein enable network operators to eliminate all IPv6 Edge-Peering from the entire network with significant OPEX savings. This, in turn, conserves computing resources, networking resources, and/or other resources that would otherwise have been wasted with providing and maintaining IPv6 interfaces on network devices, providing and maintaining the IPv6 point-to-point infrastructure links, storing the IPv6 addresses, managing IPv6 peer network devices, and obtaining IPv6 addresses from IANA (Internet Assigned Numbering Authority). Additionally, implementations described herein eliminate memory and computing resource issues of a traditional IPv6 deployments requirement of "Dual Stacking" design. In some examples, the "Dual Stacking" design may involve an IPv4 address and an IPv6 address being configured on every interface within the network.

The first network device with the elimination of all IPv6 addressing will now allow the eBGP transport networks to remain IPv4-Only indefinitely as now can technically support the identical Dual Stack infrastructure that exists today but now with IPv4-Only configured on the interface, which may provide significant reduction in infrastructure Capital expenditures (CAPEX) as the infrastructure does not need to be upgraded to support future technologies that require IPv6 transport such as MPLS LDP over IPv6, SR-MPLS over IPv6 and Segment Routing over IPv6 (SRv6). For example, implementations described herein enable network operators to eliminate all IPv6 Edge-Peering from the entire network and not have to upgrade their infrastructure to support IPv6 underlay technologies which may have significant CAPEX savings.

Figure 1B:
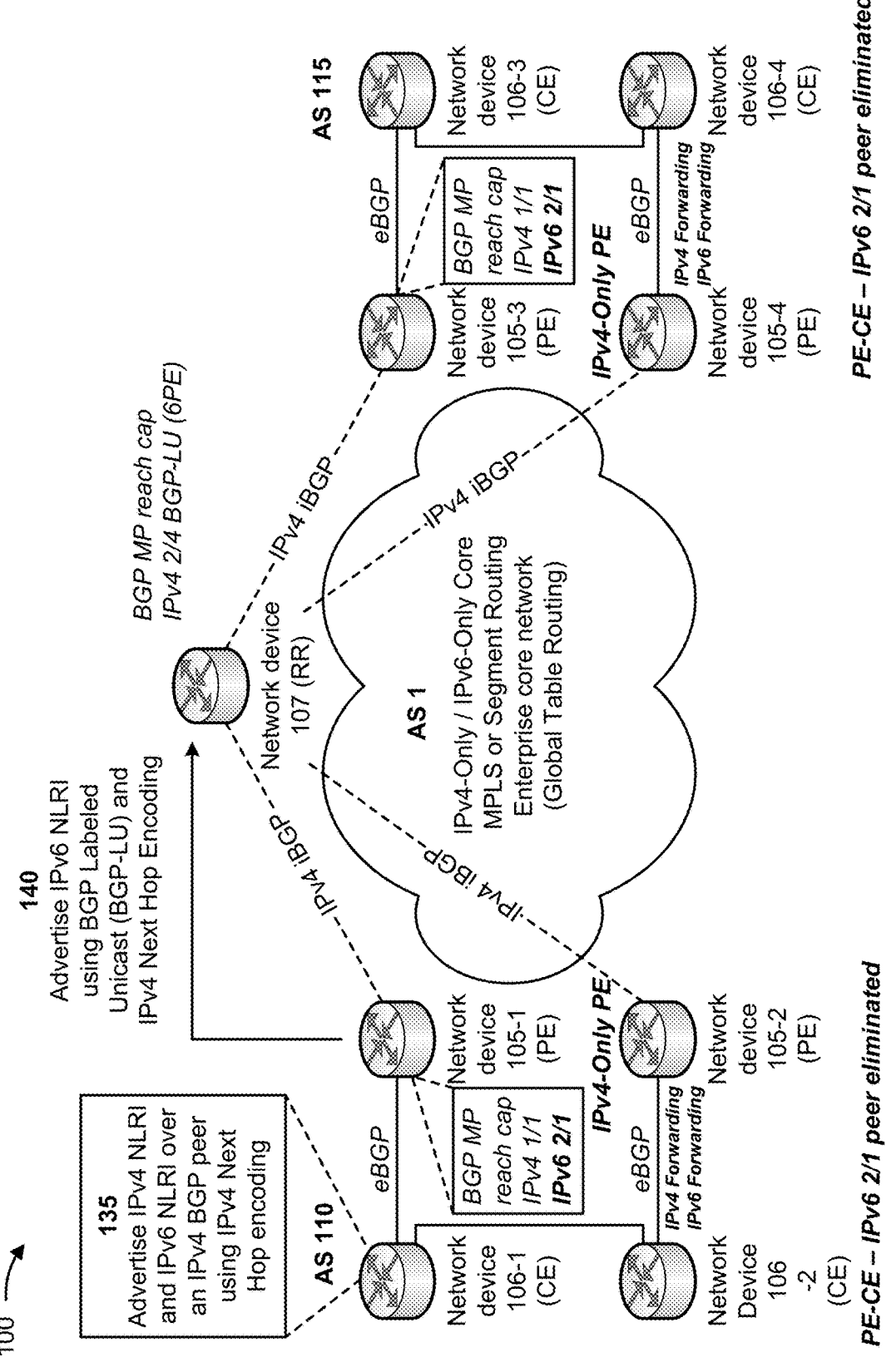

FIGS. 1A-1I are diagrams of an example 100 associated with advertising IPv6 NLRI with an IPv4 next hop over an IPv4-Only core as well as an IPv6-Only core in the diagrams shown. The IPv4-Only PE design Intra-AS use case supports IPv4-Only Core as well as IPv6-Only Core where the PE-CE peering can be an IPv4-Only PE as shown in FIGS. 1A-1B.

Figure 1C:
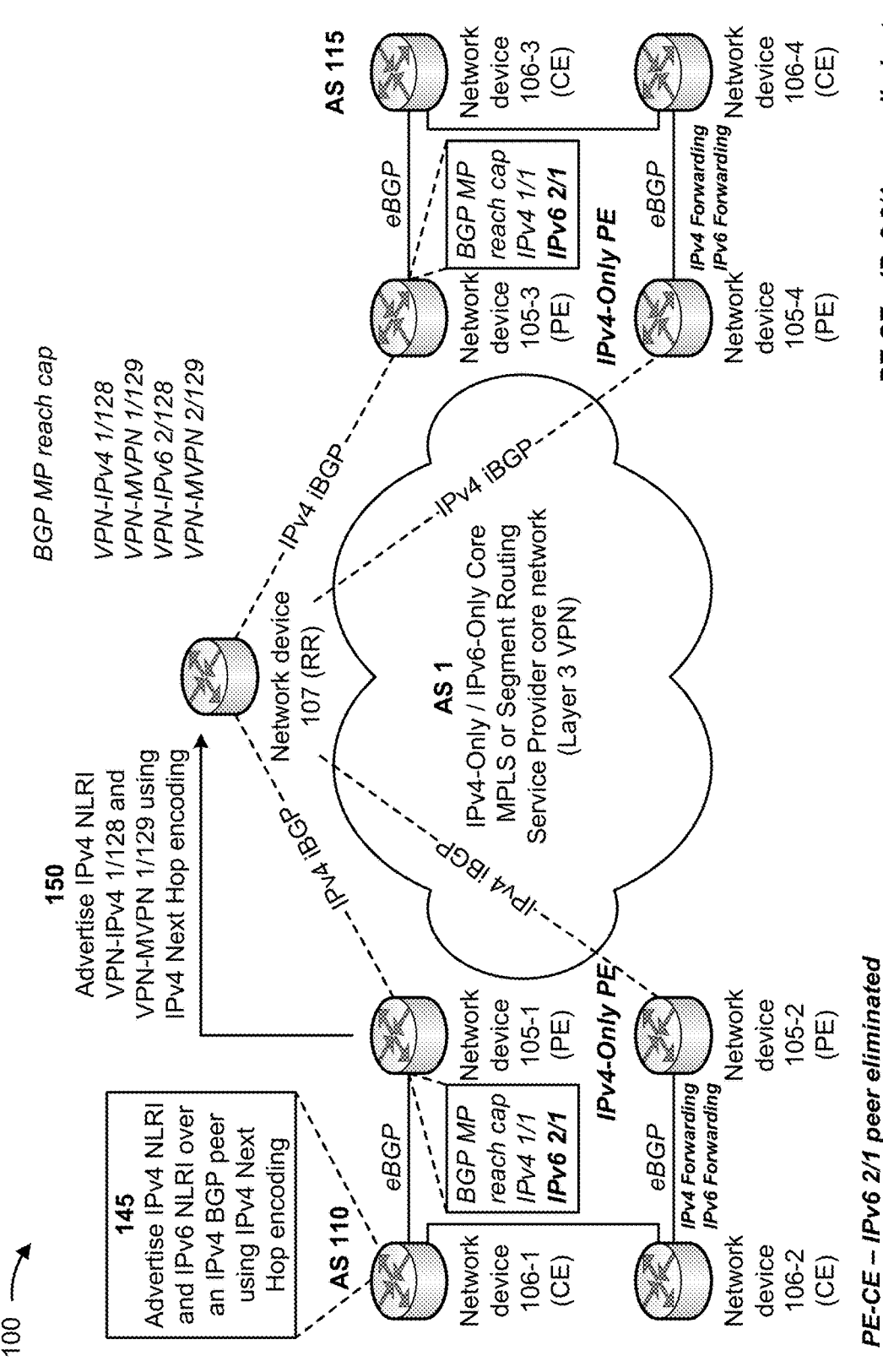
Figure 1D:
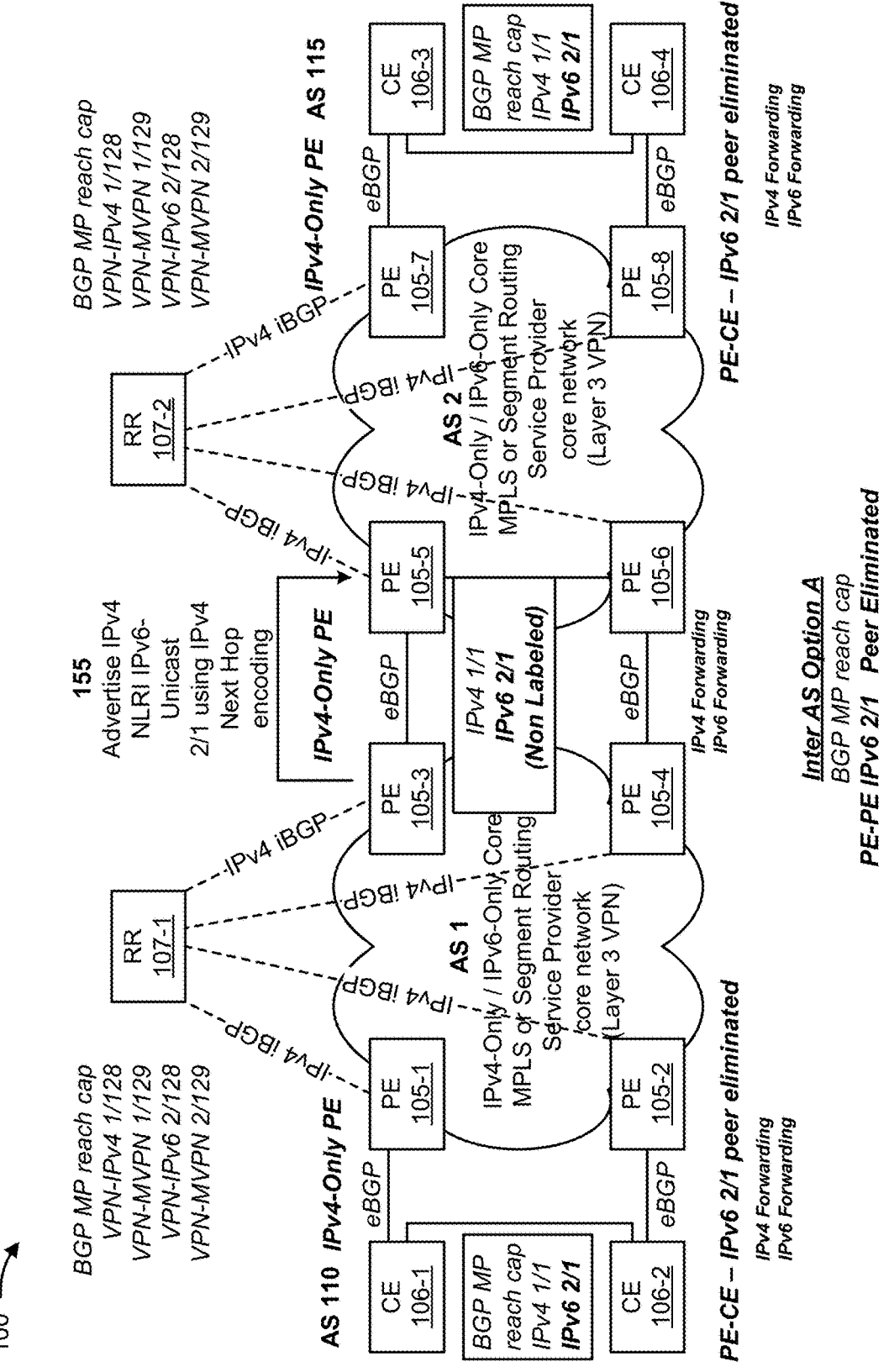
Figure 1E:
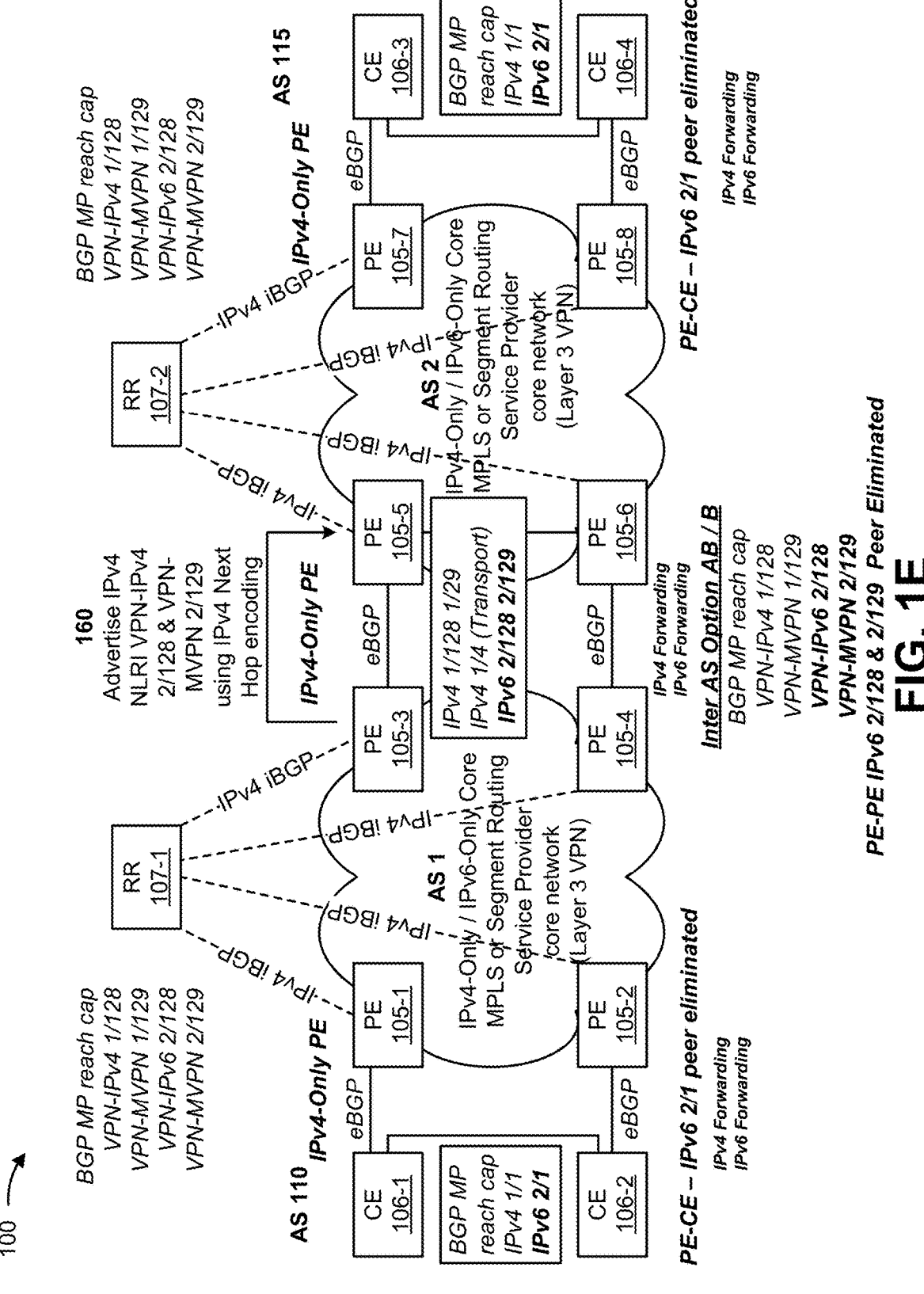
Figure 1F:
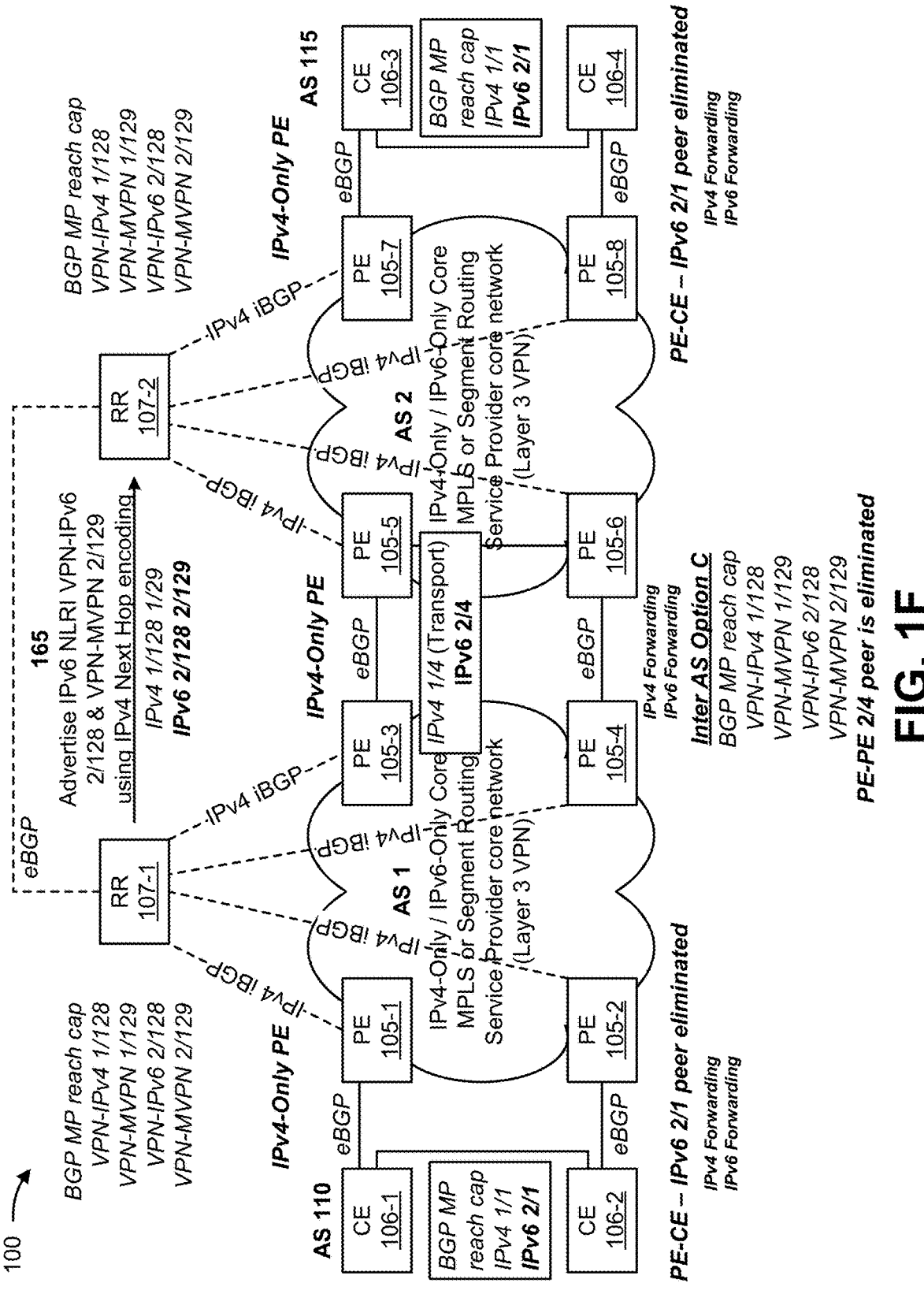
Figure 1G:
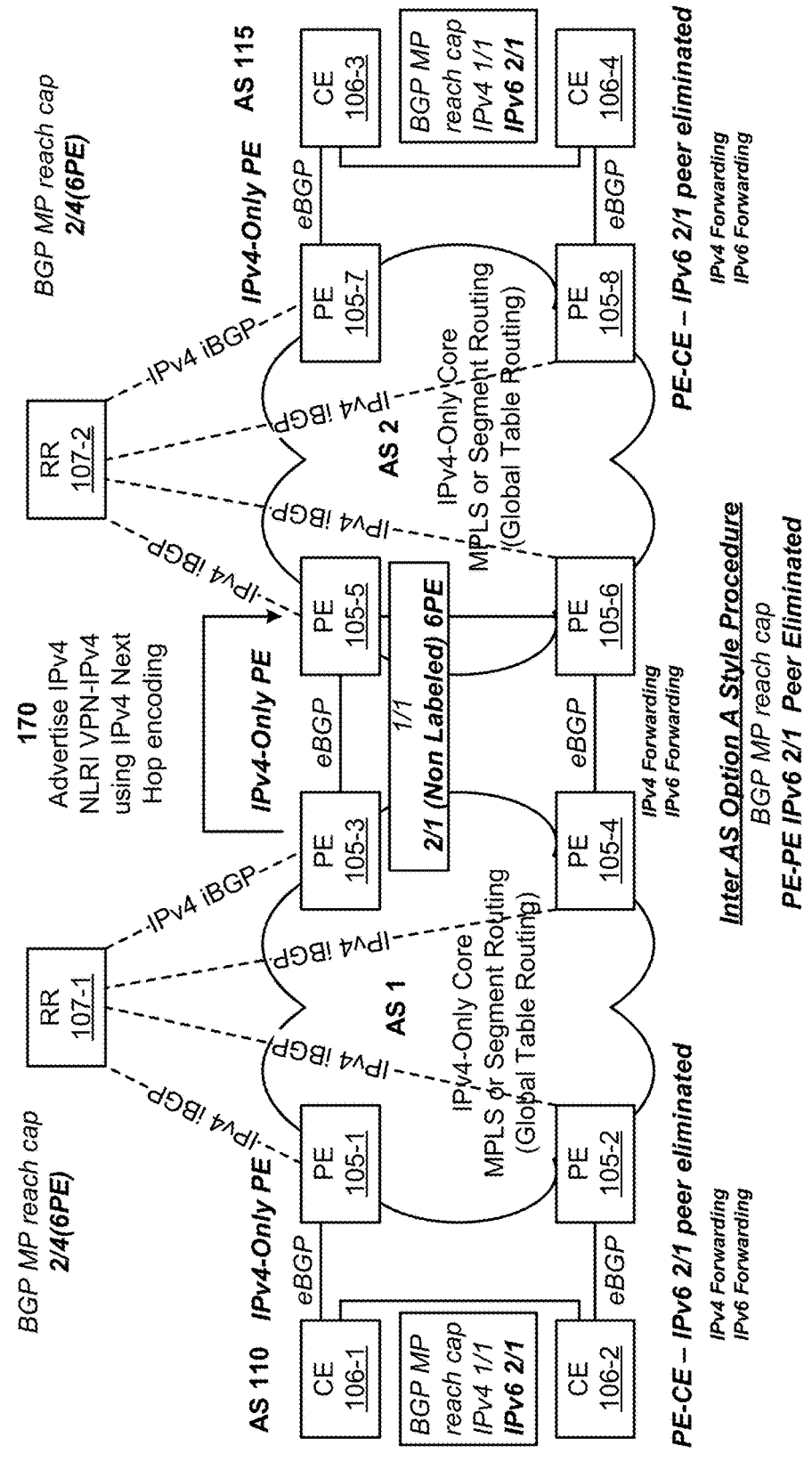
Figure 1H:
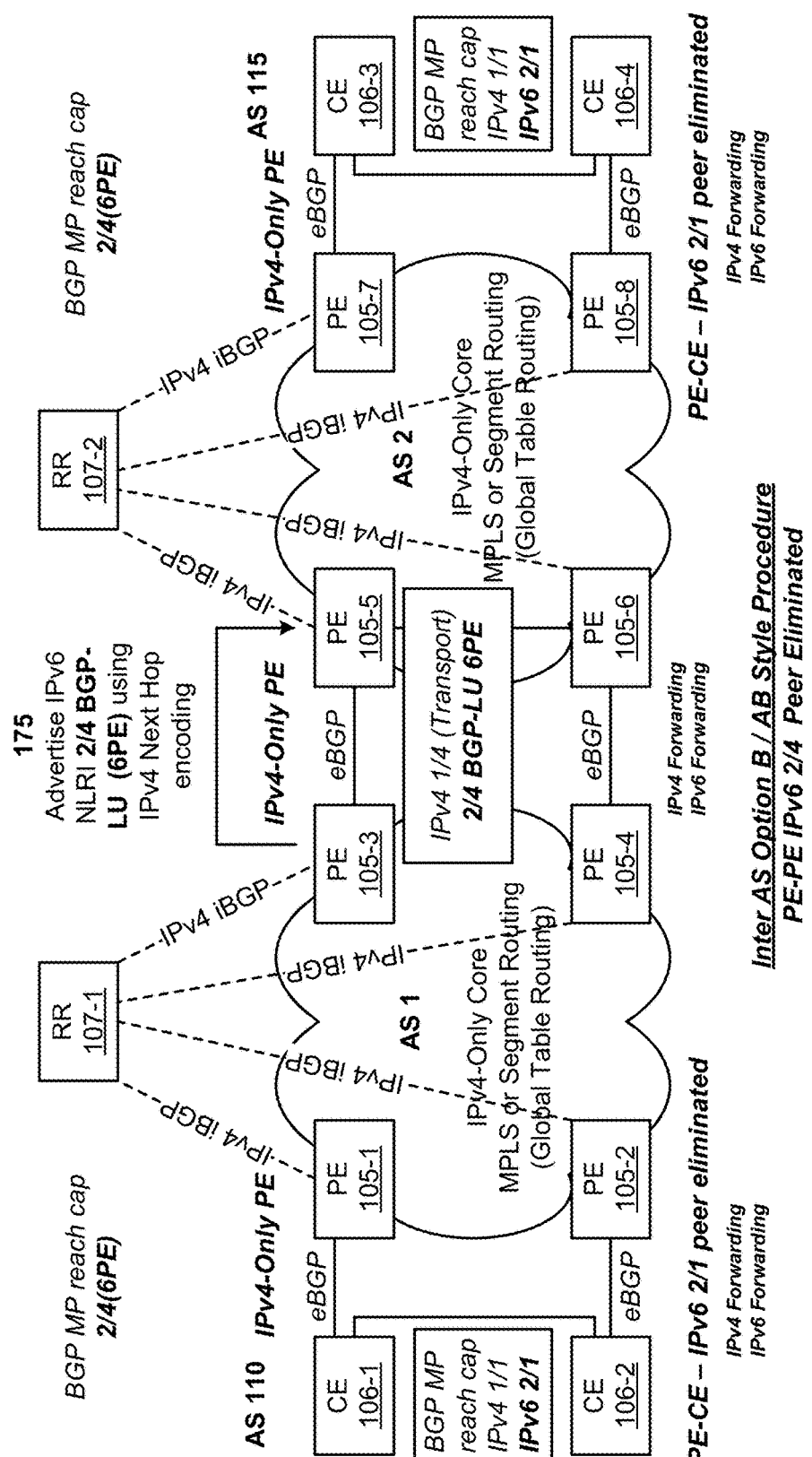
Figure 1I:
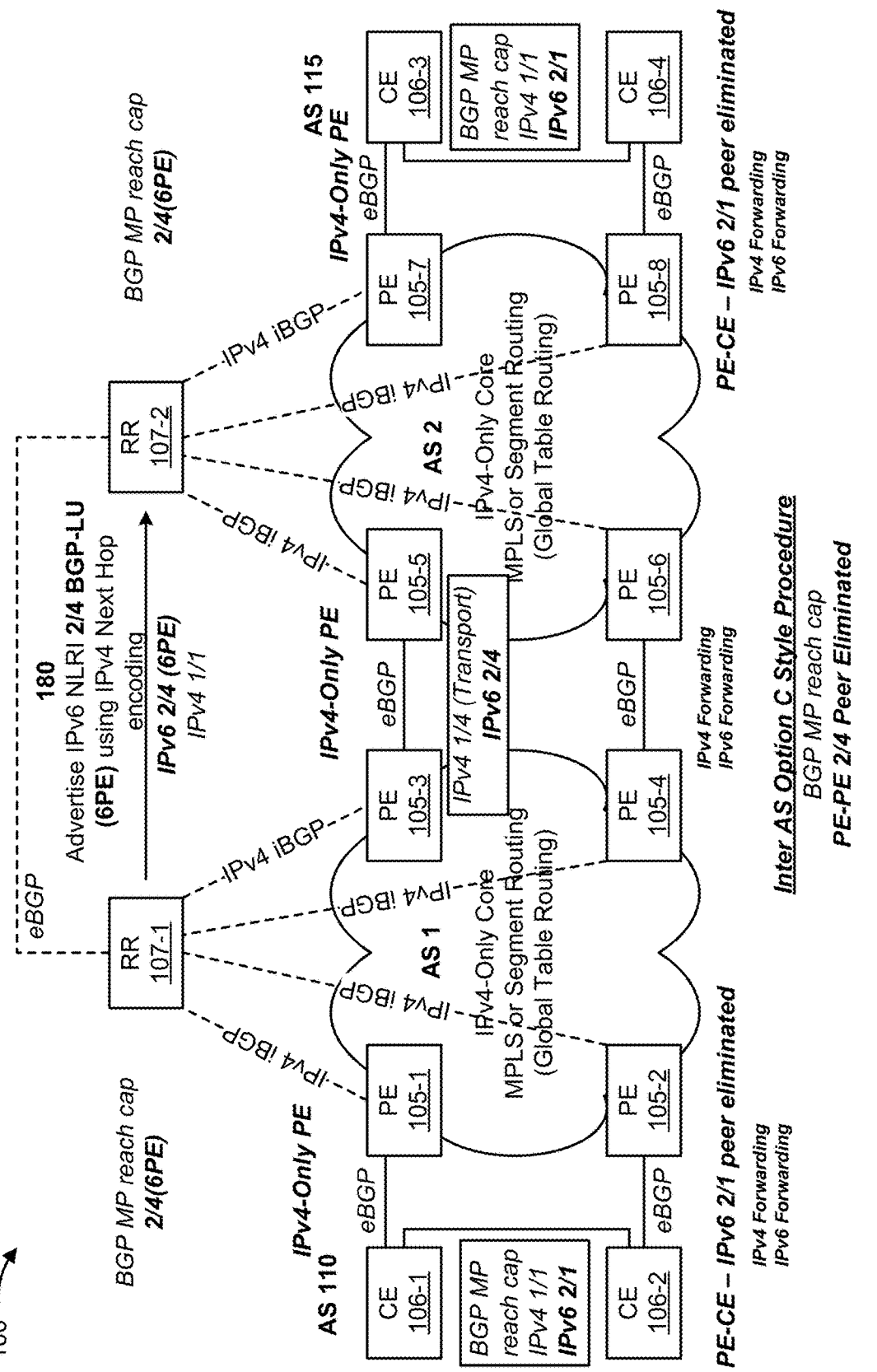

The IPv4-Only PE design Inter-AS use case supports IPv4-Only Core as well as IPv6-Only Core as well where the ASBR to ASBR Inter-AS peering can be an IPv4-Only PE, mismatch between the Core underlay transport being IPv6-Only and the Inter-AS ASBR to ASBR underlay transport being IPv4 as shown in FIGS. 1C-1I. The IPv4-Only PE design Inter-AS use case support for IPv6-Only Core for the source and destination AS with IPv4-Only PE ASBR to ASBR Inter-AS peering is supported for Inter-AS Option C End to End LSP as shown in FIGS. 1F and 1I. As shown in FIGS. 1A, example 100 may include an endpoint device 110, a server device 115, a plurality of network devices 105 (individually referred to as network device 105), a plurality of network devices 106 (individually referred to as network device 106), and a plurality of network devices 107 (individually referred to as network device 107).

One or more of network devices 105 may include a router, a gateway, a switch, a firewall, a hub, a bridge, a reverse proxy, among other examples. A network device 105 may be a PE, a network device 106 may be a CE, and a network device 107 may be an RR. Endpoint device 110 may include a mobile phone (e.g., a smart phone or a radiotelephone), a laptop computer, a tablet computer, a desktop computer, and/or the like. Server device 115 may include a laptop computer, a tablet computer, a desktop computer, a group of server devices, or a similar type of device. Although FIGS. 1A-1I describe endpoint device 110 and server device 115 interacting with two network devices 105, in some implementations, endpoint device 110 and server device 115 may interact with additional or fewer network devices 105 in a similar manner.

In FIG. 1A, network device 105-1 and network device 105-2 are both capable of forwarding IPv4 and IPv6 packets with an IPv4 address only configured on both network devices 105-1 and 105-2. As shown in FIG. 1A, endpoint device 110, may be associated with a first servicer provider (SP) network, hereinafter referred to as SP #1. SP #1 may include the first network device 105-1, communicating with a second SP network, hereinafter referred to as SP #2. SP #2 may include the second network device 105-2 which may be associated with a server device 115.

In FIGS. 1B-1I, network devices 105 and network devices 106 are capable of forwarding both IPv4 and IPv6 packets with an IPv4 address only configured on network devices 105 and network devices 106.

All network devices described herein have a control plane and data plane component, where the control plane is utilized for routing updates and advertising IPv4 NLRI and IPv6 NLRI. The IPv4 data plane is used for forwarding of IPv4 packets, and the IPv6 data plane is used to forward IPv6 packets. Implementations described in FIGS. 1A-1I enable maintaining the same functionality of "Dual Stacking" where, by definition, both IPv4 address and IPv6 address are configured on the interfaces of the network devices. By only having an IPv4 address configured on an interface, the functionality of "Dual Stacking" is still maintained, as IPv4 packets and IPv6 packets can still be forwarded.

An IPv6 address is not required to be configured on an interface to forward IPv4 packets, and an IPv6 address is not required to be configured on an interface to forward IPv6 packets. Implementations described herein are related to not configuring an IPv6 address to save on IPv6 address space and memory while still being able to forward IPv6 packets in the same manner that IPv6 packets are forwarded with an IPv6 address configured on the interface. FIGS. 1A-1I describe in detail the control plane routing advertisement of IPv4 NLRI and IPv6 NLRI within the data plane framework described above as being able to forward both IPv4 and IPv6 packets when only an IPv4 address is configured on the interfaces of all network devices described herein.

FIGS. 1A-1I depict a few examples of the implementations, however the implementations may apply to any infrastructure, Core Network, Data Center Network, or Access Network, among other examples. Layers of the network, where "Dual Stacking" exists with separate IPv4 and IPv6 BGP peering, can now utilize the implementations described herein. For example, the implementations described herein may be used to advertise both IPv4 NLRI and IPv6 NLRI control plane routing updates with a single pure IPv4 transport peer and continue to forward IPv4 and IPv6 packets in the forwarding plane with only IPv4 configured on the network interface.

FIG. 1A depicts Service Provider to Service Provider IP-Only (Non MPLS) peering where IPv4 unicast NLRI and IPv6 unicast NLRI are advertised over an IPv4 next hop with a network interface configured with only an IPv4 address and may forward both IPv4 and IPv6 packets.

As further shown in FIG. 1A, and by reference number 120, first network device 105-1 may establish an IPv4 eBGP session with second network device 105-2 associated with the second SP network. For example, first network device 105-1 may receive traffic from endpoint device 110 that is to be provided to server device 115 and may establish the IPv4 session with second network device 105-2 to provide the traffic to server device 115.

First network device 105-1 may be a PE network device of SP #1 "AS 1" and second network device 105-2 may be a PE network device of SP #2 "AS 2." In this regard, first network device 105-1 may establish the IPv4 session with second network device 105-2 in order to advertise address information associated with first network device 105-1, the first SP network, and/or endpoint device 110 to second network device 105-2.

For example, as shown in FIG. 1A, the first SP network may be associated with an IPv4 address (e.g., 192.1.1.0/24) and an IPv6 address (e.g., 2002::/48); first network device 105-1 with an IPv4 address (e.g., 10.0.0.1); the second SP network may be associated with an IPv4 address (e.g., 193.1.1.0/24) and an IPv6 address (e.g., 2003::/48); and second network device 105-2 may be associated with an IPv4 address (e.g., 10.0.0.2).

As further shown in FIG. 1A, and by reference number 125, first network device 105-1 may advertise IPv4 NLRI and IPv6 NLRI over an IPv4 BGP peer using an IPv4 next hop encoding. The IPv4 NLRI and IPv6 NLRI may be advertised to second network device 105-2 via a BGP peering (e.g., the IPv4 BGP peering). The MP-BGP peering may include IPv4 AFI with any SAFI as well as IPv6 AFI with any SAFI. Since first network device 105-1 may utilize the single IPv4 BGP single peer session as a transport, first network device 105-1 may stack both AFI for both address families IPv4 and IPv6 and all corresponding SAFI using New IPv4 next hop encoding. In this way, first network device 105-1 may enable IPv6 NLRI to be transported over an IPv4 pure transport peer (e.g., first network device 105-1) with a new IPv4 next hop encoding. This will eliminate the IPv6 eBGP Edge-Peering peering between PE network device 105-1 and PE network device 105-2 since a single IPv4 peer may be utilized as a pure transport peer to advertise both the IPv4 NLRI and the IPv6 NLRI.

In some implementations, the IPv4 and IPv6 address families (AFI) may include other SAFI, NLRI used for multicast forwarding, NLRI with multiprotocol label switching (MPLS) labels transport label, multiprotocol label switching (MPLS) labels service label (6PE), NLRI used for a multicast VPN (MVPN), NLRI used for dynamic placement of a multi-segment pseudowire, NLRI used for BGP Tunnel Encapsulation Attribute, NLRI used for Multicast Virtual Private LAN Service (MCAST-VPLS), NLRI used for a Virtual Private LAN Service (VPLS), NLRI used for BGP Multicast Distribution Tree (MDT) SAFI, NLRI used for BGP 4over6 SAFI, NLRI used for BGP 6over4 SAFI, NLRI used for Layer-1 VPN auto-discovery information, NLRI used for a BGP Ethernet VPN (EVPN), NLRI used for BGP link state (BGP-LS), NLRI used for BGP link state VPN (BGP-LS-VPN), NLRI used for Segment Routing Traffic Engineering Policy (SR TE Policy) SAFI, NLRI used for software-defined networking (SDN) in a wide area network (WAN) capabilities, NLRI used for routing policy SAFI, NLRI used for classful transport SAFI, NLRI used for Tunneled Traffic Flow Specification (FLOWSPEC) rules, NLRI used for BGP Based Multicast (MCAST-TREE), NLRI used for MPLS Labeled Virtual Private Network (VPN), NLRI used for Multicast for BGP/MPLS IP Virtual Private Network (VPN), NLRI used for route target constraints (RTC), NLRI used for dissemination of flow specification (FLOWSPEC) rules, NLRI used for Layer 3 VPN dissemination of flow specification (FLOWSPEC) rules, NLRI used for VPN auto-discovery, and/or the like.

As further shown in FIG. 1A, and by reference number 130, first network device 105-1 may advertise the IPv6 NLRI to second network device 105-2 via a single IPv4 eBGP session. For example, first network device 105-1 may advertise IPv4 NLRI (e.g., 192.1.1.0/24) and the IPv6 NLRI (e.g., 2002::/48) using a new IPv4 next hop (e.g., next hop 10.0.0.2) to second network device 105-2. In this way, first network device 105-1 and second network device 105-2 will eliminate IPv6 address provisioning requirements by eliminating IPv6 peering, may conserve memory address space, and may reduce expenditures in maintaining both IPv4 and IPv6 peering as well as reduce expenditures related to hardware upgrades for Segment Routing SRv6 technologies requiring IPv6. FIG. 1A also represents "Edge-Peering" IPv4 unicast NLRI and IPv6 unicast NLRI are advertised over an IPv4 next hop with a network interface configured with only an IPv4 address and may forward both IPv4 and IPv6 packets.

FIG. 1B depicts an MPLS or Segment Routing Enterprise IPv4-Only or IPv6-Only core network where the "Edge-Peering" IPv4 unicast NLRI and IPv6 unicast NLRI are advertised over an IPv4 next hop with a network interface configured with only an IPv4 address and may forward both IPv4 and IPv6 packets. FIG. 1B also represents a "Soft-Wire" mesh framework scenario where an IPv6 edge can be tunneled over an MPLS or Segment Routing Enterprise IPv4-Only or IPv6-Only core network. FIG. 1B also represents "Edge-Peering" IPv4 unicast NLRI and IPv6 unicast NLRI are advertised over an IPv4 next hop with a network interface configured with only an IPv4 address and may forward both IPv4 and IPv6 packets.

FIG. 1B is a diagram depicting an IPv4 MPLS Enterprise Core network or Segment Routing Core network. As shown in FIG. 1B, global table routing may be used to connect IPv6 island networks over an IPv4-Only or IPv6-Only core network and may transport IPv6 NLRI from the IPv6 island networks with an IPv4 next hop. "Global table routing" may be used to describe a routing action performed when utilizing a global routing table. An IPv6 island may include Layer 3 network devices (e.g., router network nodes) that are configured according to IPv6-only. Such Layer 3 network devices are called islands as they do not have any means of connectivity to a network external with respect to an IPv6 island network with which such Layer 3 network devices are associated.

The MPLS Enterprise Core network may include a network utilized by one or more enterprise systems. As shown in FIG. 1B, first network device 105-1 of "AS 1" may be a PE network device and network device 107 of "AS 1" may be an RR network device. All PE network devices 105 and RR network devices 107, in FIG. 1B, reside in "AS 1." Additional PE network devices 105 of "AS 1" may have eBGP peering to CE network devices 106 of "AS 110" and "AS 115." Each PE network device 105 will communicate with a corresponding CE network device 106 via a eBGP peering and may communicate with RR network device 107 via an IPv4 iBGP peering.

As further shown in FIG. 1B, each CE network device 106 MP-BGP peer will exchange MP_REACH capability with a corresponding PE network device 105 for an AFI/SAFI capability being negotiated. For example, the MP_REACH capability may include an IPv4 unicast AFI/SAFI (e.g., 1/1) and an IPv6 unicast AFI/SAFI (e.g., 2/1). As further shown in FIG. 1B, and by reference number 135, CE network device 105 may advertise the IPv4 unicast NLRI and IPv6 unicast NLRI to PE network device 105 with a new IPv4 next hop encoding. This will eliminate the IPv6 eBGP "Edge-Peering" between PE network device 105-1 and CE network device 106-1 since a single IPv4 peer may be utilized as a transport to advertise both the IPv4 unicast NLRI and the IPv6 unicast NLRI. This will also eliminate all IPv6 peers and IPv6 interfaces and conserve resources associated with the network. RR network device 107 will exchange an MP_REACH capability with a corresponding PE network device 105 for an AFI/SAFI capability being negotiated.

As further shown in FIG. 1B, and by reference number 140, PE network device 105-1 may advertise the IPv6 labeled unicast to RR network device 107 via BGP-LU (6PE). For example, PE network device 105-1 may advertise IPv6 Labeled Unicast (e.g., 1/4—IPv6 Labeled Unicast-6PE) to RR network device 107. PE network device 105-1 may connect IPv6 islands over an IPv4 core network. In this way, peering between PE network device 105-1 and RR network device 107 may be IPv4 only. For example, the MP_REACH capability may include an IPv6 BGP labeled unicast AFI/SAFI (e.g., 2/4 BGP-LU (6PE)).

Note that in the PE network device 105-1 to RR network device 107 BGP peering, the iBGP peering is over an "IPv4-Only or IPv6-Only Core." Thus, no IPv6 BGP peering is eliminated in this scenario, which has historically been the case for IPv6 Edge over an IPv4 Core. However, in contrast, all "Edge-Peering" can now take advantage of a single IPv6 transport style peering to carry all IPv4 NLRI stacked 2-tuple AFI/SAFI, where "Core-Peering" has historically has not had any saving in BGP peering reduction as the Core is either IPv4-Only or IPv6-Only. Stacking all of the IPv4 and IPv6 AFI/SAFI in this manner will also eliminate all IPv6 peers and IPv6 interfaces and conserve resources associated with the network making the PE an "IPv4-Only PE."

FIG. 1C depicts an MPLS or Segment Routing Service Provider IPv4-Only or IPv6-Only core network where the "Edge-Peering" IPv4 unicast NLRI and IPv6 unicast NLRI are advertised over an IPv4 next hop with a network interface configured with only an IPv4 address and may forward both IPv4 and IPv6 packets. FIG. 1C also represents the "Soft-Wire" mesh framework scenario where an IPv6 edge can be tunneled over an MPLS or Segment Routing Service Provider IPv4-Only or IPv6-Only core network, as discussed above in connection with FIG. 1C. FIG. 1C also represents "Edge-Peering" IPv4 unicast NLRI and IPv6 unicast NLRI are advertised over an IPv4 next hop with a network interface configured with only an IPv4 address and may forward both IPv4 and IPv6 packets.

FIG. 1C is a diagram depicting how an IPv4 MPLS service provider Core network (or Segment Routing Core network) may transport IPv6 NLRI with an IPv4 next hop. The MPLS or Segment Routing service provider Core network may include a network utilized by one or more service providers. As shown in FIG. 1C, first network device 105-1 of "AS 1" may be a PE network device and network device 107 of "AS 1" may be an RR network device. All PE network devices 105 and RR network devices 107 reside in "AS 1." Additional PE network devices 105 of "AS 1" may respectively establish eBGP peering to CE network devices 106 of "AS 110" and "AS 115." Each PE network device 105 may communicate with a corresponding CE network device 105 via eBGP peering and may communicate with RR network device 107 via IPv6 iBGP peering.

RR network device 107 will exchange an MP_REACH capability with a corresponding PE network device 105 for an AFI/SAFI capability being negotiated. For example, the MP_REACH capability may include a VPN-IPv4 AFI/SAFI (e.g., 1/128), a VPN-Multicast VPN (MVPN) IPv4 AFI/SAFI (e.g., 1/129), a VPN-IPv6 AFI/SAFI (e.g., 2/128), and a VPN-MVPN IPv6 AFI/SAFI (e.g., 2/129).

As further shown in FIG. 1C, and by reference number 150, PE network device 105-1 may advertise IPv4 NLRI and IPv6 NLRI with IPv4 next hop encoding. The IPv4 NLRI and IPv6 NLRI may be advertised to RR network device 107. The IPv4 NLRI may include an IPv4 unicast NLRI, a VPN-IPv4 NLRI, a Multicast VPN-IPv4 NLRI, and/or the like SAFIs for an IPv4 address family. The IPv6 NLRI may include an IPv6 unicast NLRI, a VPN-IPv6 NLRI, a Multicast VPN-IPv6 NLRI, and/or the like SAFIs for an IPv6 address family.

Note that in the PE network device 105-1 to RR network device 107 BGP peering, the iBGP peering is over an "IPv4-Only or IPv6-Only Core." Thus, no IPv4 BGP peering is eliminated in this scenario which has historically been the case for IPv6 Edge over an IPv4 Core. However, in contrast all "Edge-Peering" can now take advantage of a single IPv4 transport style peering to carry all IPv4 NLRI stacked 2-tuple AFI/SAFI, where "Core-Peering" has historically has not had any saving in BGP peering reduction as the Core is either IPv4-Only or IPv6-Only.

As further shown in FIG. 1C, each CE network device 106 MP-BGP peer will exchange MP_REACH capability with a corresponding PE network device 105 for an AFI/SAFI capability being negotiated. For example, the MP_REACH capability may include an IPv4 unicast AFI/SAFI (e.g., 1/1) and an IPv6 unicast AFI/SAFI (e.g., 2/1). As further shown in FIG. 1C, and by reference number 145, CE network device 106-1 may advertise the IPv4 unicast NLRI and IPv6 unicast NLRI to PE network device 105-1 network device with new IPv4 next hop encoding. This will eliminate the IPv6 eBGP "Edge-Peering" between PE network device 105-1 and CE network device 106-1, since a single IPv4 peer may be utilized as a pure transport peer to advertise both the IPv4 unicast NLRI and the IPv6 unicast NLRI. Stacking all of the IPv4 and IPv6 AFI/SAFI in this manner will also eliminate all IPv6 peers and IPv6 interfaces and conserve resources associated with the network making the PE an "IPv4-Only PE".

FIG. 1D depicts an Inter-AS Option-A peering (or Inter-AS L3 VPN Option-A peering) over an MPLS or Segment Routing Service Provider IPv4-Only or IPv6-Only core network. The Inter-AS Option-A also represents the Soft-Wire mesh framework scenario, as discussed above in connection with FIG. 1D.

FIG. 1D also depicts the IPv4-Only PE data plane forwarding framework of Inter-AS ASBR to ASBR eBGP IPv4-Only peering where IPv4 NLRI and IPv6 NLRI and the like are advertised over an IPv4 next hop with a network interface configured with only an IPv4 address. The network interface may be used for data plane forwarding both IPv4 and IPv6 control plane routing update packets.

FIG. 1D is a diagram depicting how a first IPv4 Core network (e.g., AS 1—shown to the left in FIG. 1D) may transport IPv4 NLRI with an IPv4 next hop to a second IPv4 Core network (e.g., AS 2—shown to the right in FIG. 1D). The network of the first AS and the second AS may be referred to as an Inter-AS Option-A (or Inter-AS Layer 3 VPN Option-A) network, called "Back to Back CE." Under the Inter-AS Option-A, the Inter-AS peering link is "Non Labeled". As the Inter-AS Option-A is identical to a "Back to Back CE" peering, this Inter-AS Option-A may be identical to a typical PE-CE peering as shown in FIGS. 1B-C.

As shown in FIG. 1D, network device 105-3 may be a PE network device associated with the first AS "AS 1" and network device 105-5 may be a PE network device associated with the second AS "AS 2." Additional PE network devices 105 of "AS 1" and "AS 2" may respectively establish eBGP peering to CE network devices 106 of "AS 110" and "AS 115" respectively. Each PE network device 105 may communicate with a corresponding CE network device 106 via eBGP peering and may communicate with a respective one of RR network devices 107-1 and 107-2 via IPv6 iBGP peering. Additional PE network devices 105-3 in "AS 1" may communicate with PE network devices 105-5 in "AS 2" as part of Inter-AS Layer 3 VPN Option-A eBGP peering. Each PE network device 105 may communicate with PE network device 106 via eBGP peering and may communicate with a respective one of RR network devices 107-1 and 107-2 via IPv4 iBGP peering.

PE network devices 105-1 and 105-7 will exchange an MP_REACH capability with RR network device 107-1 and 107-2, respectively, for an AFI/SAFI capability being negotiated. For example, the MP_REACH capability may include a VPN-IPv4 AFI/SAFI (e.g., 1/128), a VPN-multicast VPN (MVPN) IPv4 AFI/SAFI (e.g., 1/129), a VPN-IPv6 AFI/SAFI (e.g., 2/128), and a VPN-MVPN IPv6 AFI/SAFI (e.g., 2/129). PE network device 105-1 and 105-7 may advertise IPv4 NLRI and IPv6 NLRI using IPv4 next hop encoding. The IPv4 NLRI advertised may include the VPN-IPv4 AFI/SAFI (e.g., 1/128) and the VPN-multicast VPN (MVPN) IPv4 AFI/SAFI (e.g., 1/129). The IPv6 NLRI advertised may include the VPN-IPv6 AFI/SAFI (e.g., 2/128) and the VPN-MVPN IPv6 AFI/SAFI (e.g., 2/129). Note that in the PE network device 105-3 to RR network device 107-1 BGP peering, the iBGP peering is over an "IPv4-Only or IPv6-Only Core." Thus, no IPv4 BGP peering is eliminated in this scenario, which has historically been the case even for IPv6 Edge over an IPv4 Core. However, in contrast, all "Edge-Peering" can now take advantage of a single IPv4 transport style peering to carry all IPv4 NLRI stacked 2-tuple AFI/SAFI where "Core-Peering" has historically not had any saving in BGP peering reduction as the Core is either IPv4-Only or IPv6-Only.

As further shown in FIG. 1D, PE network device 105-3 in "AS 1" will exchange an MP_REACH capability with PE network device 105-5 in "AS-2" for an AFI/SAFI capability being negotiated for Inter-AS Layer 3 VPN ASBR to ASBR eBGP peering. For example, the MP_REACH capability may include an IPv4-unicast AFI/SAFI (e.g., 1/1) and IPv6-unicast AFI/SAFI (e.g., 2/1).

As further shown in FIG. 1D, and by reference number 155, PE network device 105-3 may advertise IPv4 NLRI and IPv6 NLRI with IPv6 next hop encoding to PE network device 105-5. The IPv4 NLRI may include an IPv4 unicast NLRI. The IPv6 NLRI may include an IPv6 unicast NLRI. Since PE network devices 105-3 and 105-5 may utilize BGP as a transport peer, PE network devices 105-3 and 105-5 may stack all of the IPv4 and IPv6 AFI/SAFI 2—tuples over single IPv4 transport peer using IPv4 next hop encoding. This will eliminate eBGP IPv6 "Edge-Peering" Inter-AS Layer 3 VPN ASBR to ASBR peering between PE network device 105-3 of "AS 1" and PE network device 105-5 of "AS 2" since a single IPv4 peer may be utilized to transport both the IPv4 NLRI and the IPv6 NLRI. Stacking all of the IPv4 and IPv6 AFI/SAFI in this manner will also eliminate all IPv6 peers and IPv6 interfaces and conserve resources associated with the network making the PE an "IPv4-Only PE."

FIG. 1E depicts an Inter-AS Option-B/AB (or Inter-AS L3 VPN Option-B and Inter-AS L3 VPN Option-AB) peering over an MPLS or Segment Routing Service Provider IPv4-Only or IPv6-Only core network. The Inter-AS L3 VPN Option-B and Inter-AS L3 VPN Option-AB peering of FIG. 1E also represents the "Soft-Wire" mesh framework scenario, as discussed above in connection with FIG. 1E.

FIG. 1E also depicts the IPv4-Only PE data plane forwarding framework of Inter-AS ASBR to ASBR eBGP IPv4-Only peering where IPv4 NLRI and IPv6 NLRI and the like are advertised over an IPv4 next hop with a network interface configured with only an IPv4 address. The network interface may be used for data plane forwarding both IPv4 and IPv6 control plane routing update packets.

FIG. 1E is a diagram depicting how a first IPv4 Core network (e.g., an AS 1—shown to the left in FIG. 1E) may transport IPv4 NLRI with an IPv4 next hop to a second IPv4 Core network (e.g., an AS 2—shown to the right in FIG. 1E). The network of the first AS and the second AS may be referred to as an Inter-AS Option-ABB (or Inter-AS Layer 3 VPN Option-AB network or an Inter-AS Layer 3 VPN Option-B network). As shown in FIG. 1E, network device 105-3 may be a PE network device associated with the first AS "AS 1" and network device 105-5 may be a PE network device associated with the second AS "AS 2." Additional PE network devices 105 of "AS 1" and "AS 2" may respectively establish eBGP peering to CE network devices 106 of "AS 110" and "AS 115" respectively. Each PE network device 105 may communicate with a corresponding CE network device 106 via eBGP and may communicate with a respective one of RR network devices 107-1 and 107-2 via IPv4 iBGP. Additional PE network devices 105 "AS 1" may communicate with PE network devices in a different AS 107 "AS 2" as Inter-AS Layer 3 VPN Option-AB or Option-B eBGP peering.

PE network devices 105-1 and 105-7 will exchange an MP_REACH capability with RR network device 107-1 and 107-2, respectively, for an AFI/SAFI capability being negotiated. For example, the MP_REACH capability may include a VPN-IPv4 AFI/SAFI (e.g., 1/128), a VPN-multicast VPN (MVPN) IPv4 AFI/SAFI (e.g., 1/129), a VPN-IPv6 AFI/SAFI (e.g., 2/128), and a VPN-MVPN IPv6 AFI/SAFI (e.g., 2/129). PE network device 105-1 and 105-7 may advertise IPv4 NLRI and IPv6 NLRI using IPv4 next hop encoding. The IPv4 NLRI advertised may include the VPN-IPv4 AFI/SAFI (e.g., 1/128) and the VPN-multicast VPN (MVPN) IPv4 AFI/SAFI (e.g., 1/129). The IPv6 NLRI advertised may include the VPN-IPv6 AFI/SAFI (e.g., 2/128) and the VPN-MVPN IPv6 AFI/SAFI (e.g., 2/129).

PE network device 105-3 in "AS 1" will exchange an MP_REACH capability with PE network device 105-5 in "AS-2" for an AFI/SAFI capability being negotiated for Inter-AS Layer 3 VPN ASBR to ASBR eBGP peering. For example, the MP_REACH capability may include a VPN-IPv4 AFI/SAFI (e.g., 1/128), an MVPN IPv4 AFI/SAFI (e.g., 1/129), a VPN-IPv6 AFI/SAFI (e.g., 2/128), and a VPN-MVPN IPv6 AFI/SAFI (e.g., 2/129). PE network device 105-3 may advertise IPv4 NLRI and IPv6 NLRI using IPv4 next hop encoding to PE network device 105-5. The IPv4 NLRI advertised may include the VPN-IPv4 AFI/SAFI (e.g., 1/128) and the VPN-MVPN IPv4 AFI/SAFI (e.g., 1/129). The IPv6 NLRI advertised may include the VPN-IPv6 AFI/SAFI (e.g., 2/128) and the VPN-MVPN IPv6 AFI/SAFI (e.g., 2/129).

As further shown in FIG. 1E, and by reference number 160, PE network device 105-3 may advertise IPv4 NLRI and IPv6 NLRI with IPv4 next hop encoding (e.g., to PE network device 105-5). The IPv4 NLRI may include an IPv4 unicast NLRI, a VPN-IPv4 NLRI, a multicast VPN-IPv4 NLRI, among other examples of SAFIs for an IPv4 address family. The IPv6 NLRI may include an IPv6 unicast NLRI, a VPN-IPv6 NLRI, a multicast VPN-IPv6 NLRI, among other examples of SAFIs for an IPv6 address family. Since PE network devices 105-3 and 105-5 may utilize BGP as a transport peer, PE network devices 105-3 and 105-5 may stack all of the IPv4 and IPv6 AFI/SAFI 2—tuples over a single IPv4 transport peer using IPv4 next hop encoding. Stacking all of the IPv4 and IPv6 AFI/SAFI in this manner will also eliminate all IPv6 peers and IPv6 interfaces and conserve resources associated with the network making the PE an "IPv4-Only PE." FIG. 1F depicts an Inter-AS Option-C (or Inter-AS L3 VPN Option-C) peering over an MPLS or Segment Routing Service Provider IPv4-Only or IPv6-Only core network. The Inter-AS Option-C also represents the Soft-Wire mesh framework scenario, as discussed above in connection with FIG. 1F.

FIG. 1F also depicts the IPv4-Only PE data plane forwarding framework of Inter-AS ASBR to ASBR eBGP IPv4-Only peering where IPv4 NLRI and IPv6 NLRI and the like are advertised over an IPv4 next hop with a network interface configured with only an IPv4 address. The network interface may be used for data plane forwarding both IPv4 and IPv6 control plane routing update packets.

FIG. 1F is a diagram depicting how a first IPv4 Core network (e.g., an AS 1—shown to the left in FIG. 1F) may transport IPv4 NLRI and IPv6 NLRI with an IPv4 next hop to a second IPv4 Core network (e.g., an AS 2—shown to the right in FIG. 1F). The network of the AS 1 and the AS 2 may be referred to as an Inter-AS Option-C (or an Inter-AS Layer 3 VPN Option-C). The interconnections and communication between PE network devices 105, CE network devices 106, and RR network devices 107 have been described above (e.g., in connection with FIG. 1F).

PE network devices 105-1 and 105-7 may exchange an MP_REACH capability with RR network device 107-1 and 107-2 for an AFI/SAFI capability being negotiated. For example, the MP_REACH capability may include a VPN-IPv4 AFI/SAFI (e.g., 1/128), a VPN-MVPN IPv4 AFI/SAFI (e.g., 1/129), a VPN-IPv6 AFI/SAFI (e.g., 2/128), and a VPN-MVPN IPv6 AFI/SAFI (e.g., 2/129). PE network devices 105-1 and 106-1 may advertise IPv4 NLRI and IPv6

NLRI using IPv4 next hop encoding. The IPv4 NLRI advertised may include the VPN-IPv4 AFI/SAFI (e.g., 1/128) and the MVPN IPv4 AFI/SAFI (e.g., 1/129). The IPv6 NLRI advertised may include the VPN-IPv6 AFI/SAFI (e.g., 2/128) and the VPN-MVPN IPv6 AFI/SAFI (e.g., 2/129).

As shown in FIG. 1F, RR network device 107-1 of "AS 1" will exchange an MP_REACH capability with RR network device 107-2 of "AS 2" for an AFI/SAFI capability being negotiated for RR to RR Inter-AS Layer 3 VPN Option-C eBGP peering. For example, the MP_REACH capability may include a VPN-IPv4 AFI/SAFI (e.g., 1/128), a VPN-MVPN IPv4 AFI/SAFI (e.g., 1/129), a VPN-IPv6 AFI/SAFI (e.g., 2/128), and a VPN-MVPN IPv6 AFI/SAFI (e.g., 2/129). RR network device 107-1 may advertise IPv4 NLRI and IPv6 NLRI with IPv6 next hop encoding to RR network device 107-2 with Next-Hop-Unchanged. As further shown in FIG. 1F, and by reference number 165, RR network device 107-1 may advertise IPv4 NLRI and IPv6 NLRI using IPv6 next hop encoding (e.g., to RR network device 107-2). The IPv4 NLRI may include an IPv4 unicast NLRI, a VPN-IPv4 NLRI, a MVPN-IPv4 NLRI, among other examples of SAFIs for an IPv4 address family. The IPv6 NLRI may include an IPv6 unicast NLRI, a VPN-IPv6 NLRI, a multicast VPN-IPv6 NLRI, and/or the like SAFIs for an IPv6 address family. Since the Core network is an IPv4-Only Core or IPv6-Only Core, single protocol Core network, there is no peer elimination for the RR to RR eBGP "Edge Peering."

PE network device 105-3 in "AS 1" will exchange an MP_REACH capability with PE network device 105-5 in "AS-2" for an AFI/SAFI capability being negotiated for Inter-AS Layer 3 VPN Option-C PE-PE (ASBR-ASBR) eBGP peering. For example, the MP_REACH capability may include IPv4 BGP labeled unicast AFI/SAFI (e.g., 1/4 BGP-LU) and IPv6 BGP labeled unicast AFI/SAFI (e.g., 2/4 BGP-LU). PE network device 105-3 may advertise IPv4 NLRI and IPv6 NLRI using IPv4 next hop encoding to network device 105-5. The IPv6 NLRI advertised over IPv4 pure transport peer may include the IPv4 BGP labeled unicast AFI/SAFI (e.g., 1/4 BGP-LU) and IPv6 BGP labeled unicast AFI/SAFI (e.g., 2/4 BGP-LU). Stacking all of the IPv4 and IPv6 AFI/SAFI in this manner will also eliminate all IPv6 peers and IPv6 interfaces and conserve resources associated with the network making the PE an "IPv4-Only PE."

FIG. 1G depicts an Inter-AS Option-A style procedure peering over an MPLS or Segment Routing Service Provider IPv4-Only Core network. The Inter-AS L3 VPN Option-A Style Procedure peering of FIG. 1G also represents the "Soft-Wire" mesh framework scenario, as discussed above in connection with FIG. 1G.

FIG. 1G also depicts the IPv4-Only PE data plane forwarding framework of Inter-AS ASBR to ASBR eBGP IPv4-Only peering where IPv4 NLRI and IPv6 NLRI and the like are advertised over an IPv4 next hop with a network interface configured with only an IPv4 address. The network interface may be used for data plane forwarding both IPv4 and IPv6 control plane routing update packets.

FIG. 1G depicts a diagram showing IPv6 provider edge (6PE) global routing table reachability using underlay MPLS IPv4 signaled LSP and overlay Bottom of Stack Label (BOS) S bit set for 6PE router. All IPv6 prefixes may be advertised as labeled prefixes using IPv6 BGP Labeled Unicast (BGP-LU). This 6PE design provides routing connectivity for IPv6 islands over an IPv4-Only Core. FIG. 1G is a diagram depicting how a first IPv4 Core network (e.g., an AS 1—shown to the left in FIG. 1G) may transport IPv6 NLRI with an IPv4 next hop to a second IPv4 Core network (e.g., an AS 2—shown to the right in FIG. 1G).

The connectivity between the network of the first AS and the network of the second AS may be referred to as an Inter-AS Option-A style procedure network. The Inter-AS Option-A style procedure network utilizes procedures similar to procedures of Inter-AS Option-A, described above. The interconnections and communication between PE network devices 105, CE network devices 106, and RR network devices 107 have been described above.

PE network devices 105-1 and 105-7 will exchange an MP_REACH capability with RR network devices 107-1 and 107-2, respectively, for an AFI/SAFI capability being negotiated, in a manner similar to the manner described above in connection with FIG. 1G. For example, the MP_REACH capability may include IPv6-Labeled Unicast AFI/SAFI (e.g., 2/4) for 6PE. PE network devices 105-1 and 105-7 may advertise IPv4 NLRI and IPv6 NLRI using IPv4 next hop encoding, in a manner similar to the manner described above.

PE network device 105-3 in "AS 1" will exchange an MP_REACH capability with PE network device 105-5 in "AS-2" for an AFI/SAFI capability being negotiated for Inter-AS Option-A style procedure ASBR to ASBR eBGP peering, in a manner similar to the manner described above in connection with FIG. 1G. As shown in FIG. 1G, and by reference number 170, PE network device 105-3 may advertise IPv4 NLRI and IPv6 NLRI with IPv4 next hop encoding (e.g., to PE network device 105-5), in a manner similar to the manner described above. Since PE network devices 105-3 and 105-5 may utilize BGP as a transport peer, PE network devices 105-3 and 105-5 may stack all of the IPv4 and IPv6 AFI/SAFI 2—tuples, over single IPv4 transport peer using IPv4 next hop encoding. This will eliminate eBGP "Edge-Peering" Inter-AS Layer 3 VPN ASBR to ASBR peering between PE network device 105-3 of "AS 1" and PE network device 105-5 of "AS 2" since a single IPv4 peer may be utilized to transport both the IPv4 NLRI and the IPv6 NLRI. Stacking all of the IPv4 and IPv6 AFI/SAFI in this manner will also eliminate all IPv6 peers and IPv6 interfaces and conserve resources associated with the network making the PE an "IPv4-Only PE."

FIG. 1H depicts an Inter-AS Option-B/AB style procedure peering over an MPLS or Segment Routing Service Provider IPv4-Only network, where the Edge-Peering IPv4 unicast NLRI and IPv6 unicast NLRI are advertised, as discussed above in connection with FIG. 1H. The Inter-AS Option-B/AB style procedure peering of FIG. 1H may also represent the Soft-Wire mesh framework scenario, as discussed above in connection with FIG. 1H.

FIG. 1H also depicts the IPv4-Only PE data plane forwarding framework of Inter-AS ASBR to ASBR eBGP IPv4-Only peering where IPv4 NLRI and IPv6 NLRI and the like are advertised over an IPv4 next hop with a network interface configured with only an IPv4 address. The network interface may be used for data plane forwarding both IPv4 and IPv6 control plane routing update packets.

FIG. 1H depicts a diagram showing 6PE global routing table reachability using underlay MPLS IPv4 signaled LSP and overlay Bottom of Stack Label (BOS) S bit for 6PE router. All IPv6 prefixes may be advertised as labeled prefixes using IPv6 BGP-LU. This 6PE design provides routing connectivity for IPv6 islands over an IPv4-Only Core. FIG. 1H is a diagram depicting how a first IPv4 Core network (e.g., an AS 1—shown to the left in FIG. 1H) may transport IPv6 NLRI with an IPv4 next hop to a second IPv4 Core network (e.g., an AS 2—shown to the right in FIG. 1H).

The connectivity between the network of the first AS and the network of the second AS may be referred to as an Inter-AS Option-ABB style procedure network. The Inter-AS Option-ABB style procedure network utilizes procedures similar to procedures of Inter-AS Option-AB/B, described above. The interconnections and communication between PE network devices 105, CE network devices 106, and RR network devices 107 have been described above.

PE network devices 105-1 and 105-7 will exchange an MP_REACH capability with RR network devices 107-1 and 107-2, respectively, for an AFI/SAFI capability being negotiated, in a manner similar to the manner described above in connection with FIG. 1H. For example, the MP_REACH capability may include IPv6-Labeled Unicast AFI/SAFI (e.g., 2/4) for 6PE. PE network devices 105-1 and 105-7 may advertise IPv4 NLRI and IPv6 NLRI using IPv4 next hop encoding. The IPv6 NLRI advertised may include IPv6-Labeled Unicast AFI/SAFI (e.g., 2/4) for 6PE.

PE network device 105-3 in "AS 1" will exchange an MP_REACH capability with PE network device 105-5 in "AS-2" for an AFI/SAFI capability being negotiated for Inter-AS ASBR to ASBR eBGP peering, in a manner similar to the manner described above.

As shown in FIG. 1H, and by reference number 175, PE network devices 105-3 may advertise IPv4 NLRI and IPv6 NLRI using IPv4 next hop encoding (e.g., to PE network device 105-5). The IPv4 NLRI may include IPv4-Labeled Unicast NLRI, among other examples. The IPv6 NLRI may include IPv6-Labeled unicast AFI/SAFI (e.g., 2/4) for 6PE, among other examples. Since PE network devices 105-3 and 105-5 may utilize BGP as a transport peer, PE network devices 105-3 and 105-5 may stack all of the IPv4 and IPv6 AFI/SAFI 2—tuples over single IPv4 transport peer using IPv4 next hop encoding. This will eliminate eBGP "Edge-Peering" Inter-AS Layer 3 VPN ASBR to ASBR peering between PE network device 105-3 of "AS 1" and PE network device 105-5 of "AS 2" since a single IPv4 peer may be utilized to transport both the IPv4 NLRI and the IPv6 NLRI. Stacking all of the IPv4 and IPv6 AFI/SAFI in this manner will also eliminate all IPv6 peers and IPv6 interfaces and conserve resources associated with the network making the PE an "IPv4-Only PE."

FIG. 1I depicts an Inter-AS Option-C style procedure peering over an MPLS or Segment Routing Service Provider IPv4-Only network, where the Edge-Peering IPv4 unicast NLRI and IPv6 unicast NLRI are advertised, as discussed above in connection with FIG. 1I. The Inter-AS Option-C style procedure peering of FIG. 1I may also represent the Soft-Wire mesh framework scenario, as discussed above in connection with FIG. 1I.

FIG. 1I also depicts the IPv4-Only PE data plane forwarding framework of Inter-AS ASBR to ASBR eBGP IPv4-Only peering where IPv4 NLRI and IPv6 NLRI and the like are advertised over an IPv4 next hop with a network interface configured with only an IPv4 address. The network interface may be used for data plane forwarding both IPv4 and IPv6 control plane routing update packets.

FIG. 1I depicts a diagram showing 6PE global routing table reachability using underlay MPLS IPv4 signaled LSP and overlay Bottom of Stack Label (BOS) S bit for 6PE router. All IPv6 prefixes may be advertised as labeled prefixes using IPv6 BGP-LU. This 6PE design provides routing connectivity for IPv6 islands over an IPv4-Only Core. FIG. 1I is a diagram depicting how a first IPv4 Core network (e.g., an AS 1—shown to the left in FIG. 1I) may transport IPv6 NLRI with an IPv4 next hop to a second IPv4 Core network (e.g., an AS 2—shown to the right in FIG. 1I).

The connectivity between the network of the first AS and the network of the second AS may be referred to as an Inter-AS Option-C style procedure network. The Inter-AS Option-C style procedure network utilizes procedures similar to procedures of Inter-AS Option-C, described above in connection with FIG. 1I. The interconnections and communication between PE network devices 105, CE network devices 106, and RR network devices 107 have been described above (e.g., in connection with FIG. 1I).

PE network devices 105-1 and 105-7 will exchange an MP_REACH capability with RR network devices 107-1 and 107-2, respectively, for an AFI/SAFI capability being negotiated, in a manner similar to the manner described above in connection with FIG. 1H. For example, the MP_REACH capability may include IPv6-Labeled Unicast AFI/SAFI (e.g., 2/4) for 6PE. PE network devices 105-1 and 105-7 may advertise IPv4 NLRI and IPv6 NLRI using IPv4 next hop encoding. The IPv6 NLRI advertised may include IPv6-Labeled Unicast AFI/SAFI (e.g., 2/4) for 6PE.

As further shown in FIG. 1I, and by reference number 180, RR network device 107-1 may advertise IPv4 NLRI and IPv6 NLRI using IPv4 NH encoding to RR network device 107-2 eBGP peering with Next-Hop-Unchanged.

As shown in FIG. 1I, RR network device 107-1 of "AS 1" will exchange an MP_REACH capability with RR network device 107-2 of "AS 2" for an AFI/SAFI capability being negotiated for RR to RR Inter-AS Option-C style procedure. For example, the MP_REACH capability may include IPv6-Labeled Unicast AFI/SAFI (e.g., 2/4) for 6PE and IPv4-Unicast (e.g., 1/1).

RR network device 107-1 may advertise IPv4 NLRI and IPv6 NLRI with IPv4 next hop encoding to RR network device 107-2. The IPv4 NLRI may include an IPv4 unicast NLRI (e.g., 1/4) The IPv6 NLRI may include IPv6-Labeled Unicast AFI/SAFI (e.g., 2/4) for 6PE. Since the Core network is a single protocol IPv4-Only core, the RR to RR eBGP "Edge Peering" must be single protocol as well identical to the iBGP PE to RR peering where peering cannot be eliminated, thus for Inter-AS Option-C style procedure RR to RR IPv6 peering is not eliminated.

PE network device 105-3 in "AS 1" will exchange an MP_REACH capability with PE network device 105-5 in "AS-2" for an AFI/SAFI capability being negotiated for Inter-AS Layer 3 VPN Option-C Style Procedure PE-PE (ASBR-ASBR) eBGP peering. For example, the MP_REACH capability may include IPv4 BGP labeled unicast AFI/SAFI (e.g., 1/4 BGP-LU) and IPv6 BGP labeled unicast AFI/SAFI (e.g., 2/4 BGP-LU) for 6PE. PE network device 105-3 may advertise IPv4 NLRI and IPv6 NLRI using IPv4 next hop encoding to network device 105-5. The IPv6 NLRI advertised over IPv4 pure transport peer may include the IPv4 BGP labeled unicast AFI/SAFI (e.g., 1/4 BGP-LU) and IPv6 BGP labeled unicast AFI/SAFI (e.g., 2/4 BGP-LU) for 6PE. Stacking all of the IPv4 and IPv6 AFI/SAFI in this manner will also eliminate all IPv6 peers and IPv6 interfaces and conserve resources associated with the network making the PE an "IPv4-Only PE."

Implementations described herein enable network operators to eliminate all IPv6 Edge-Peering from a network and remain IPv4-Only PE Edge indefinitely. Implementations described herein involve the concept of a pure transport only peering design where the first SAFI or base SAFI may be the transport peer and maybe unicast SAFI value "1" which may be used to establish the transport peer for native eBGP only "Edge Peering."

Implementations described herein enable network operators to eliminate all IPv6 Inter-AS ASBR to ASBR Edge-Peering from a network and remain IPv4-Only PE Edge indefinitely. Implementations described herein involve the concept of a pure transport only peering design where the first SAFI or base SAFI may be the transport peer and maybe labeled unicast SAFI value "4" which may be used to establish the transport peer for eBGP "Edge Peering."

In some examples, the transport peer may be established using MP-BGP. Once the transport peer is established, MP_REACH capability may be exchanged. The IPv4 unicast base transport SAFI may then be able to carry any IPv6 address family SAFI over an eBGP peering, thereby enabling a single pure transport IPv4 peer to carry all IPv6 address family SAFI. The IPv6 address family SAFI carried by the IPv4 pure transport peer may include different types of NLRI (e.g., an IPv4 4 byte prefix, or an IPv6 16 byte prefix, among other examples).

To further illustrate the concept of AFI/SAFI stacking of the IPv4-Only PE Design on a pure IPv4 eBGP transport peer, FIGS. 1A-1I provide example use cases of four AFI/SAFI customer edge NLRI prefixes that are carried Intra-AS or carried Inter-AS over an IPv4 pure transport peer. The four AFI/SAFI 2-tuple combinations classified as "Customer edge NLRI prefixes" propagated end to end from ingress CE to egress CE may include IPv6-Unicast AFI/SAFI (e.g., 2/1), VPN-IPv6 AFI/SAFI (e.g., 1/128), VPN-Multicast VPN (MVPN) IPv6 AFI/SAFI (e.g., 1/129), and IPv6 Labeled Unicast (BGP-LU-"6PE") AFI/SAFI (e.g., 2/4). FIGS. 1A-1I illustrate that implementations described herein may be data plane agnostic and support all existing data planes, such as IP "Non MPLS" based data plane, MPLS based data plane, SR-MPLS based data plane, and SRv6 based data plane as well as future data planes. All other existing AFI/SAFI or future AFI/SAFI 2-tuple combinations can be stacked onto a single IPv4 Pure transport peer and are applicable to either Inter-AS peering or peering to a BGP controller, SDN controller, or Path Computation Element (PCE) controller.

Implementations described herein conserve computing resources, networking resources, and/or other resources that would otherwise have been wasted with providing and maintaining IPv6 interfaces on network devices, providing and maintaining the IPv6 point-to-point infrastructure links, storing the IPv6 addresses, managing IPv6 peer network devices, and obtaining from IANA (Internet Assigned Numbering Authority) an IPv6 address block. Implementations described herein eliminate memory and computing resource issues from a traditional IPv6 deployments requirement of Dual Stacking design.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
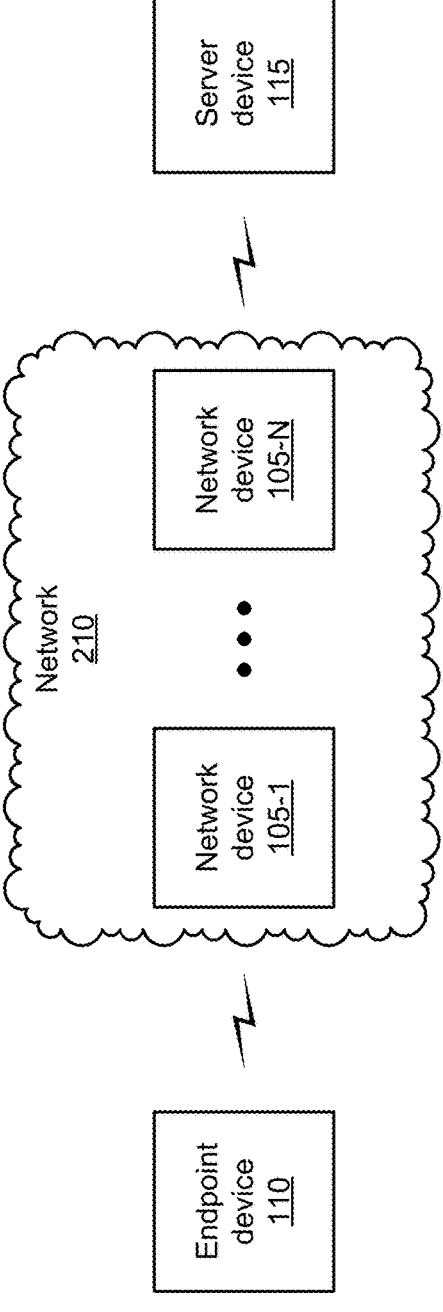
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a group of network devices 105 (shown as network device 105-1 through network device 105-N), endpoint device 110, server device 115, and a network 210. Devices of environment 200 may interconnect via wired connections, wireless connections, or a combination of wired and wireless connections.

Network device 105 includes one or more devices capable of receiving, processing, storing, routing, and/or providing traffic (e.g., a packet or other information or metadata) in a manner described herein. For example, network device 105 may include a router, such as a label switching router (LSR), a label edge router (LER), an ingress router, an egress router, a provider router (e.g., a provider edge router or a provider Core router), a virtual router, or another type of router. Additionally, or alternatively, network device 105 may include a gateway, a switch, a firewall, a hub, a bridge, a reverse proxy, a server (e.g., a proxy server, a cloud server, or a data center server), a load balancer, and/or a similar device. In some implementations, network device 105 may be a physical device implemented within a housing, such as a chassis. In some implementations, network device 105 may be a virtual device implemented by one or more computer devices of a cloud computing environment or a data center. In some implementations, a group of network devices 105 may be a group of data center nodes that are used to route traffic flow through network 210.

Endpoint device 110 includes one or more devices capable of receiving, generating, storing, processing, and/or providing information, such as information described herein. For example, endpoint device 110 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 110 may receive network traffic from and/or may provide network traffic to other endpoint devices 110 and/or server device 115, via network 210 (e.g., by routing packets using network devices 105 as intermediaries).

Server device 115 includes one or more devices capable of receiving, generating, storing, processing, and/or providing information, such as information described herein. For example, server device 115 may include a laptop computer, a tablet computer, a desktop computer, a group of server devices, or a similar type of device. In some implementations, server device 115 may receive information from and/or transmit information (e.g., traffic) to endpoint device 110, via network 210 (e.g., by routing packets using network devices 105 as intermediaries).

Network 210 includes one or more wired and/or wireless networks. For example, network 210 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
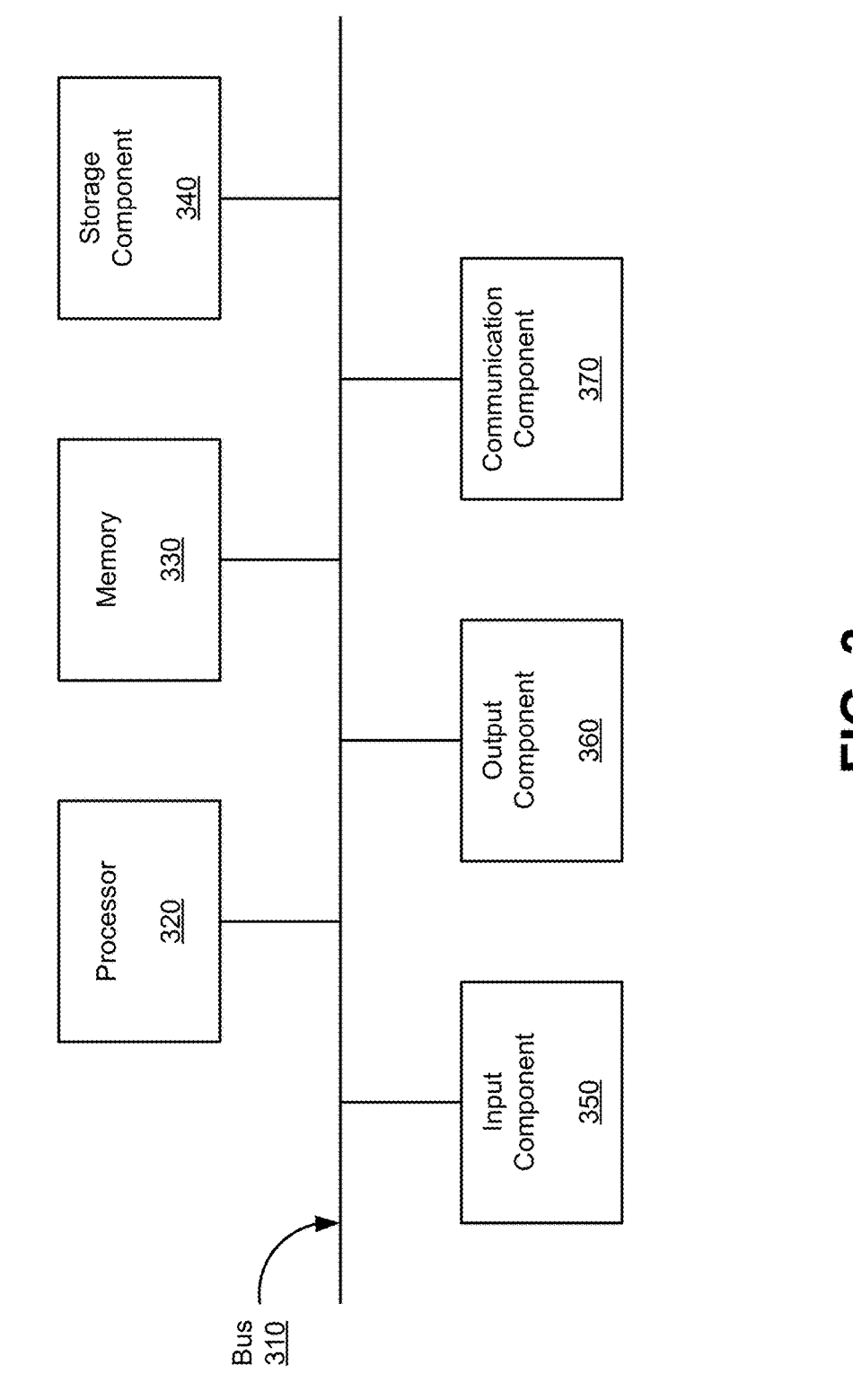
FIGS. 3 and 4 are diagrams of example components of one or more devices of FIG. 2.

FIG. 3 is a diagram of example components of one or more devices of FIG. 2. The example components may be included in a device 300, which may correspond to network device 105, endpoint device 110, and/or server device 115. In some implementations, network device 105, endpoint device 110, and/or server device 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
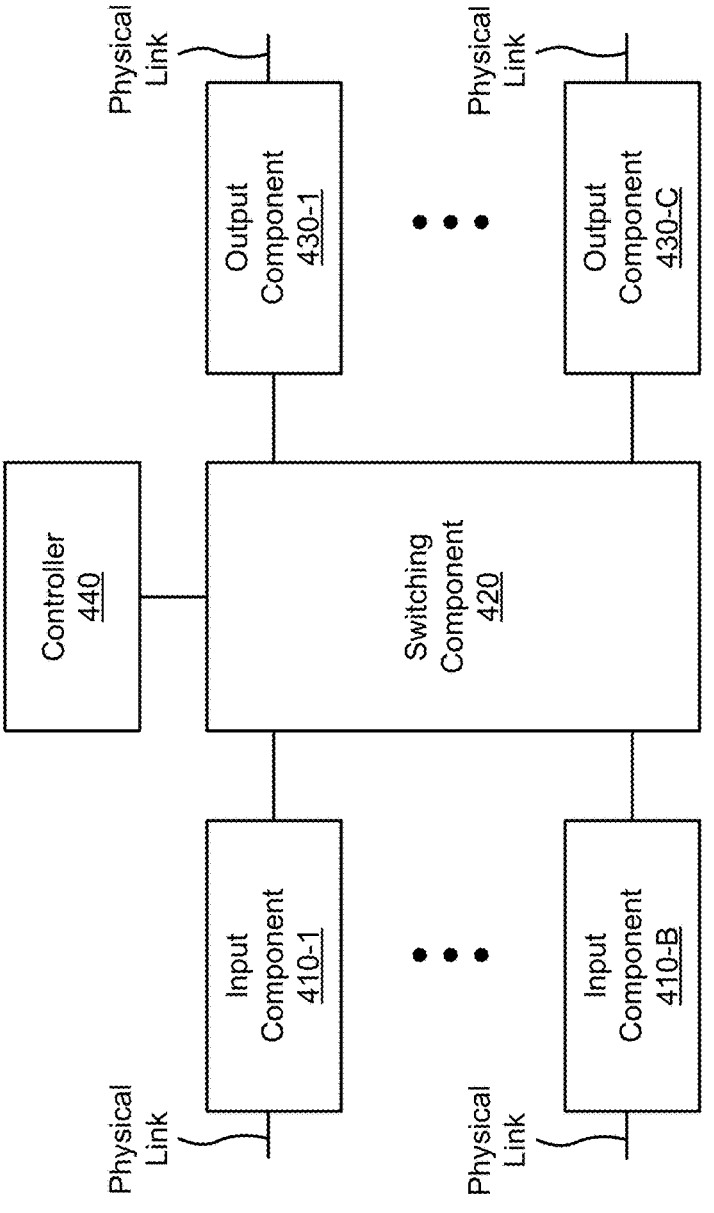

FIG. 4 is a diagram of example components of one or more devices of FIG. 2. The example components may be included in a device 400. Device 400 may correspond to network device 105. In some implementations, network device 105 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
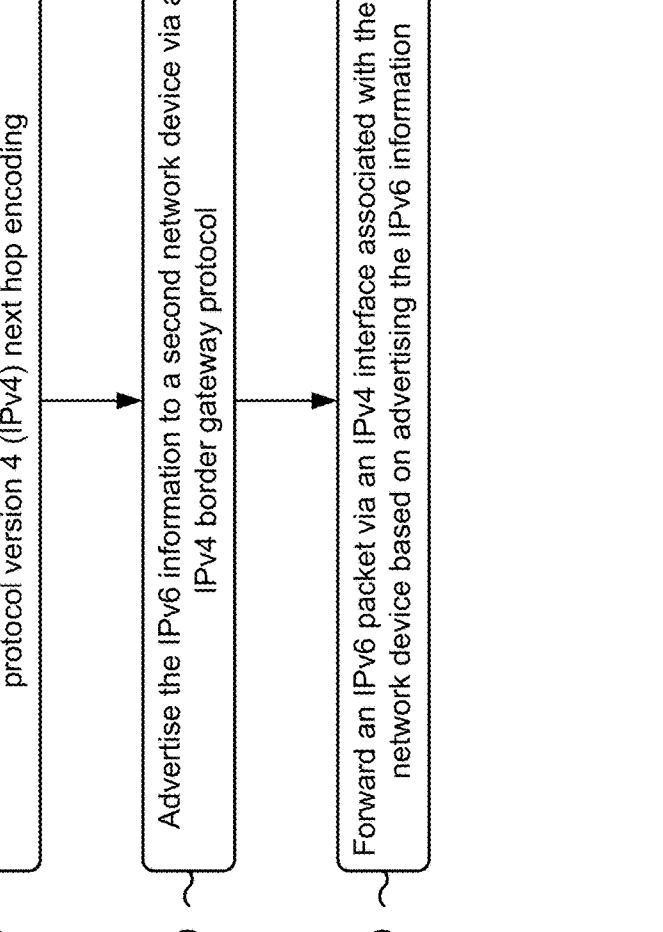
FIG. 5 is a flowchart of an example process for advertising IPv6 NLRI with an IPv4 next hop.

FIG. 5 is a flowchart of an example process 500 for advertising IPv6 NLRI with an IPv4 next hop. In some implementations, one or more process blocks of FIG. 5 may be performed by a first network device (e.g., first network device 105). In some implementations, one or more process blocks of FIG. 5 may be performed by another device or a group of devices separate from or including the first network device, such as a second network device (e.g., network device 106), and/or a third network device (e.g., network device 107). Additionally, or alternatively, one or more process blocks of FIG. 5 may be performed by one or more components of device 300, such as processor 320, memory 330, storage component 340, input component 350, output component 360, and/or communication interface 370.

As shown in FIG. 5, process 500 may include encoding Internet protocol version 6 (IPv6) information using Internet protocol version 4 (IPv4) next hop encoding (block 510). For example, the first network device may encode IPv6 network layer reachability information using IPv4 next hop encoding, as described above.

In some implementations, the first network device is associated with a network, and wherein the network includes a multiprotocol label switching (MPLS) IPv6 core network, or a segment routing (SR) MPLS IPv6 core network. In some implementations, the first network device and the second network device are associated with a same autonomous system, or the first network device and the second network device are associated with different autonomous systems.

As further shown in FIG. 5, process 500 may include advertising the IPv6 information to a second network device via an IPv4 border gateway protocol (block 520). For example, the first network device may advertise the IPv6 network layer reachability information to a second network device via an IPv4 border gateway protocol, as described above.

In some implementations, advertising the IPv6 information comprises advertising IPv6 unicast network layer reachability information, advertising virtual private network (VPN) IPv6 network layer reachability information, or advertising multicast VPN IPv6 network layer reachability information.

In some implementations, advertising the IPv6 information comprises advertising IPv6 network layer reachability information via an IPv6 internal border gateway protocol (BGP) peer.

In some implementations, process 500 includes including information indicating a BGP labeled unicast (BGP-LU) in the IPv6 information, prior to advertising the IPv6 information. For example, the first network device may include information indicating a BGP-LU in the IPv6 network layer reachability information, prior to advertising the IPv6 network layer reachability information.

As further shown in FIG. 5, process 500 may include forwarding an IPv6 packet via an IPv4 interface associated with the first network device based on advertising the IPv6 information (block 530). For example, the first network device may forward an IPv6 packet via an IPv4 interface associated with the first network device based on advertising the IPv6 network layer reachability information, as described above.

In some implementations, process 500 includes forwarding, by the first network device, an IPv4 packet via the IPv4 interface.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a first network device, the method comprising:

encoding, by the first network device, Internet protocol version 4 (IPv4) next hop of Internet protocol version 6 (IPv6) information;

advertising, by the first network device, the IPV6 information using IPv4 next hop encoding to a second network device via an IPV4 border gateway protocol, wherein advertising the IPV6 information using the IPV4 next hop encoding comprises advertising the IPV6 information using an IPV4 next hop address; and forwarding, by the first network device, an IPV6 packet via an interface associated with the first network device based on advertising the IPV6 information, wherein the IPV6 packet is forwarded using an IPV6 data plane of the first network device.

2. The method of claim 1, further comprising:

configuring an IPV4 address on the interface without configuring an IPV6 address on the interface, wherein the forwarding the IPV6 packet via the interface is performed without configuring the IPV6 address on the interface.

3. The method of claim 1, further comprising:

forwarding Internet assigned numbers authority address family identifier and subsequent address family identifier via IPv4 next hop, wherein forwarding the Internet assigned numbers authority address family identifier and subsequent address family identifier comprises: forwarding IPv4 address family identifier and subsequent address family identifier and IPV6 address family identifier and subsequent address family identifier via a single IPv4 border gateway protocol session of the IPV4 border gateway protocol.

4. The method of claim 1, wherein advertising the IPV6 information comprises:

advertising IPv6 network layer reachability information via an IPV4 external border gateway protocol (BGP) peer, wherein the IPV6 network layer reachability information is advertised using an IPv4 next hop address.

5. The method of claim 1, wherein the first network device is associated with a network, and wherein the network includes:

a multiprotocol label switching (MPLS) IPv4 core network,
a multiprotocol label switching (MPLS) IPv6 core network,
a Segment Routing (MPLS) IPv4 core network,
a Segment Routing (MPLS) IPv6 core network,
a Segment Routing over IPv6 (SRv6) core network,
a multiprotocol label switching (MPLS) IPv4 core network,
a multiprotocol label switching (MPLS) IPv6 core network,
a Segment Routing MPLS IPv4 core network,
a Segment Routing (MPLS) IPv6 core network,
a Segment Routing over IPv6 (SRv6) core network,
a IPv4 core network,
a IPv6 core network,
a IPv4 Data Center network, or
a IPv6 Data Center network.

6. The method of claim 1, wherein advertising the IPV6 information comprises:

advertising IPv6 unicast network layer reachability information,
advertising virtual private network (VPN) IPv6 network layer reachability information,
advertising multicast VPN IPV6 network layer reachability information,
advertising NLRI with MPLS Labels IPv6 network layer reachability information (6PE),
advertising multicast IPv6 network layer reachability information,
advertising MCAST-VPN IPv6 network layer reachability information,
advertising Tunnel Encapsulation SAFI IPV6 network layer reachability information,
advertising MCAST-VPLS IPv6 network layer reachability information,
advertising SFC IPv6 network layer reachability information,
advertising MDT SAFI IPV6 network layer reachability information,
advertising 4to6 SAFI IPV6 network layer reachability information,
advertising 6to4 SAFI IPV6 network layer reachability information,
advertising Layer-1 VPN Auto-Discovery IPv6 network layer reachability information,
advertising EVPNs IPv6 network layer reachability information,
advertising BGP-LS VPN IPV6 network layer reachability information,
advertising BGP-LS-VPN VPN IPV6 network layer reachability information,
advertising SR-TE Policy SAFI IPV6 network layer reachability information,
advertising SD-WAN Capabilities IPv6 network layer reachability information,
advertising Routing Policy SAFI IPV6 network layer reachability information,
advertising Tunnel Traffic Flowspec IPv6 network layer reachability information,
advertising MCAST-TREE IPV6 network layer reachability information,
advertising BGP-DPS IPv6 network layer reachability information,
advertising BGP-LS-SPF IPV6 network layer reachability information,
advertising Route Target Constrains IPV6 network layer reachability information,
advertising multicast VPN IPV6 network layer reachability information,
advertising multicast VPN IPV6 network layer reachability information,
advertising Flow Specification Rules IPv6 network layer reachability information,
advertising multiprotocol label switching (MPLS) labels network layer reachability information,
advertising L3 VPN Flow Specification Rules IPV6 network layer reachability information, or
advertising VPN Auto-Discovery IPv6 network layer reachability information.

7. The method of claim 1, wherein the first network device and the second network device are associated with different autonomous systems.

8. A first network device, comprising:

one or more processors configured to:

advertise, to a second network device via a border gateway protocol, Internet protocol version 6 (IPv6) information using Internet protocol version 4 (IPv4) next hop encoding, wherein the IPV6 information is advertised using an IPV4 next hop address;

configure an IPV4 address on an interface associated with the first network device; and forward an IPV6 packet via the interface based on advertising the IPV6 information.

9. The first network device of claim 8, wherein the one or more processors, to configure the IPV4 address of the interface, are configured to:

configure an IPV4 address on the interface without configuring an IPV6 address on the interface associated with the first network device.

10. The first network device of claim 8, wherein the one or more processors, to advertise the IPV6 information, are configured to:

advertise IPv6 network layer reachability information to the second network device via an IPv4 border gateway protocol.

11. The first network device of claim 8, wherein the first network device is a customer edge network device and the second network device is a provider edge network device, or wherein the first network device is a provider edge network device and the second network device is a route reflector network device.

12. The first network device of claim 8, wherein, to advertise the IPV6 information using the IPV4 next hop encoding, the one or more processors are further configured to:

include information indicating border gateway protocol in the IPV6 information; and after including the information indicating border gateway protocol labeled unicast in the IPV6 information, advertise the IPv6 information including the information indicating border gateway protocol.

13. The first network device of claim 8, wherein the first network device is associated with a network, and wherein the network includes:

a multiprotocol label switching (MPLS) IPv6 core network, or a segment routing (SR) MPLS IPV6 core network.

14. The first network device of claim 8, wherein the first network device and the second network device are associated with a same autonomous system, or wherein the first network device and the second network device are associated with different autonomous systems.

15. A non-transitory computer-readable medium storing a set of instructions, the set of instructions comprising:

one or more instructions that, when executed by one or more processors of a first device, cause the first device to:

encode Internet protocol version 6 (IPv6) information using Internet protocol version 4 (IPv4) next hop encoding; and advertise the IPV6 information to a second device via an IPV4 border gateway protocol, wherein the IPV6 information is advertised using an IPV4 next hop address, and wherein the one or more instructions, that cause the first device to advertise the IPV6 information, cause the first device to:

advertise IPv6 unicast network layer reachability information, advertise virtual private network (VPN) IPv6 network layer reachability information, or advertise multicast VPN IPV6 network layer reachability information.

16. The non-transitory computer-readable medium of claim 15, wherein the one or more instructions, when executed by the one or more processors, further cause the first device to:

include, in the IPV6 information, information indicating border gateway protocol, prior to advertising the IPV6 information.

17. The non-transitory computer-readable medium of claim 15, wherein the one or more instructions, that cause the first device to advertise the IPV6 information, cause the first device to:

advertise IPV6 network layer reachability information to the second device via an IPV4 internal border gateway protocol.

18. The non-transitory computer-readable medium of claim 15, wherein the first device and the second device are associated with a same autonomous system, or wherein the first device and the second device are associated with different autonomous systems.

19. The non-transitory computer-readable medium of claim 15, wherein the one or more instructions, when executed by the one or more processors, further cause the first device to:

forward an IPV6 packet via an interface associated with the first device, based on advertising the IPV6 information.

20. The non-transitory computer-readable medium of claim 15, wherein the first device is associated with a network, and wherein the network includes:

a multiprotocol label switching (MPLS) IPv6 core network, or a segment routing (SR) MPLS IPV6 core network.

* * * * *